US007812729B2

(12) United States Patent  
Copeland

(10) Patent No.: US 7,812,729 B2
(45) Date of Patent: Oct. 12, 2010

(54) COMBINATION EAS AND RFID LABEL OR TAG WITH CONTROLLABLE READ RANGE USING A HYBRID RFID ANTENNA

(75) Inventor: Richard L. Copeland, Lake Worth, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 336 days.

(21) Appl. No.: 11/939,851

(22) Filed: Nov. 14, 2007

(65) Prior Publication Data

US 2008/0068177 A1 Mar. 20, 2008

Related U.S. Application Data

(63) Continuation-in-part of application No. 11/667,742, filed as application No. PCT/US2005/041575 on Nov. 15, 2005.

(51) Int. Cl.
*G08B 13/14* (2006.01)
(52) U.S. Cl. ............... 340/572.7; 340/572.1; 340/572.6; 340/572.8; 340/568.1; 343/700 MS; 343/728
(58) Field of Classification Search ... 340/572.1–572.9, 340/568.1, 825.54; 343/700 MS, 725–730
See application file for complete search history.

(56) References Cited

U.S. PATENT DOCUMENTS

| 6,097,347 | A | 8/2000 | Duan et al. |
| 6,121,878 | A | 9/2000 | Brady et al. |
| 6,147,606 | A | 11/2000 | Duan |
| 6,333,719 | B1 | 12/2001 | Varadan et al. |
| 6,388,628 | B1 * | 5/2002 | Dettloff et al. ............... 343/742 |

(Continued)

FOREIGN PATENT DOCUMENTS

FR 2890592 A1 3/2007

(Continued)

OTHER PUBLICATIONS

International Search Report dated Mar. 20, 2009 for International Application Serial No.: PCT/US2008/012756, International Filing Date Nov. 12, 2008 consisting of 13-pages.

(Continued)

*Primary Examiner*—Anh V La
(74) *Attorney, Agent, or Firm*—Alan M. Weisberg; Christopher & Weisberg, P.A.

(57) ABSTRACT

A security tag includes an EAS component having a defined surface area, and an RFID component having a defined surface area. The EAS component surface area is configured to at least partially overlap the RFID component surface area. The RFID component includes an antenna which at least partially overlaps the first surface. A substantially planar spacer having a thickness is at least partially disposed between the defined surface areas of the EAS and RFID components. The RFID element read range is affected and controlled by the spacing between the RFID element and the EAS element. The RFID reader is capable of activating the RFID component when the RFID component is within the read range. The antenna includes a magnetic loop antenna in electrical contact with a spiral antenna to increase near field read response.

17 Claims, 15 Drawing Sheets

U.S. PATENT DOCUMENTS

| | | |
|---|---|---|
| 6,999,028 B2 * | 2/2006 | Egbert ................ 343/700 MS |
| 7,109,867 B2 | 9/2006 | Forster |
| 2007/0052613 A1 | 3/2007 | Gallschuetz et al. |
| 2008/0198078 A1 | 8/2008 | Caruana et al. |

FOREIGN PATENT DOCUMENTS

| | | |
|---|---|---|
| WO | 0036572 A1 | 6/2000 |
| WO | 03083988 A1 | 10/2003 |
| WO | 2004093246 A1 | 10/2004 |

OTHER PUBLICATIONS

First Office Action dated Mar. 31, 2009, issued in U.S. Appl. No. 11/667,742, filed May 14, 2007 (10 pages).

First Office Action dated Mar. 31, 2009, issued in U.S. Appl. No. 11/667,743, filed May 14, 2007 (16 pages).

* cited by examiner

COMBINATION EAS AND RFID LABEL OR TAG WITH CONTROLLABLE READ RANGE USING A HYBRID RFID ANTENNA

CROSS-REFERENCE TO RELATED APPLICATION

This application is a Continuation-in-Part Application of U.S. National Stage application Ser. No. 11/667,742, filed May 14, 2007, entitled COMBINATION EAS AND RFID LABEL OR TAG WITH CONTROLLABLE READ RANGE, based on PCT Application Number PCT/US2005/041575, filed Nov. 15, 2005, entitled COMBINATION EAS AND RFID LABEL OR TAG WITH CONTROLLABLE READ RANGE which is related to and claims priority to U.S. Provisional Application Ser. No. 60/628,303, filed Nov. 15, 2004, entitled COMBO EAS/RFID LABEL OR TAG, the entirety of which all are incorporated herein by reference.

STATEMENT REGARDING FEDERALLY SPONSORED RESEARCH OR DEVELOPMENT n/a

FIELD OF THE INVENTION

The present disclosure relates to an electronic article surveillance (EAS) label or tag for the prevention or deterrence of unauthorized removal of articles from a controlled area. More particularly, the present disclosure relates to an EAS label or tag combined with a radiofrequency identification (RFID) label or tag where the combination EAS/RFID label has a controllable read range using a hybrid RFID antenna inlay.

BACKGROUND OF THE INVENTION

Electronic article surveillance (EAS) systems are generally known in the art for the prevention or deterrence of unauthorized removal of articles from a controlled area. In a typical EAS system, EAS markers (tags or labels) are designed to interact with an electromagnetic field located at the exits of the controlled area, such as a retail store. These EAS markers are attached to the articles to be protected. If an EAS tag is brought into the electromagnetic field or "interrogation zone," the presence of the tag is detected and appropriate action is taken, such as generating an alarm. For authorized removal of the article, the EAS tag can be deactivated, removed or passed around the electromagnetic field to prevent detection by the EAS system.

EAS systems typically employ either reusable EAS tags or disposable EAS tags or labels to monitor articles to prevent shoplifting and unauthorized removal of articles from the store. The reusable EAS tags are normally removed from the articles before the customer exits the store. The disposable tags or labels are generally attached to the packaging by adhesive or are located inside the packaging. These tags typically remain with the articles and must be deactivated before they are removed from the store by the customer. Deactivation devices may use coils which are energized to generate a magnetic field of sufficient magnitude to render the EAS tag inactive. The deactivated tags are no longer responsive to the incident energy of the EAS system so that an alarm is not triggered.

For situations where an article having an EAS tag is to be checked-in or returned to the controlled area, the EAS tag must be activated or re-attached to once again provide theft deterrence. Because of the desirability of source tagging, in which EAS tags are applied to articles at the point of manufacturing or distribution, it is typically preferable that the EAS tags be deactivatable and activatable rather than be removed from the articles. In addition, passing the article around the interrogation zone presents other problems because the EAS tag remains active and can interact with EAS systems in other controlled areas inadvertently activating those systems.

Radio-frequency identification (RFID) systems are also generally known in the art and may be used for a number of applications, such as managing inventory, electronic access control, security systems, and automatic identification of cars on toll roads. An RFID system typically includes an RFID reader and an RFID device. The RFID reader may transmit a radio-frequency carrier signal to the RFID device. The RFID device may respond to the carrier signal with a data signal encoded with information stored by the RFID device.

The market need for combining EAS and RFID functions in the retail environment is rapidly emerging. Many retail stores that now have EAS for shoplifting protection rely on bar code information for inventory control. RFID offers faster and more detailed inventory control over the bar code. Retail stores already pay a considerable amount for hard tags that are re-useable. Adding RFID technology to EAS hard tags could easily pay for the added cost due to improved productivity in inventory control as well as loss prevention.

In addition, in order to minimize interactions between the EAS and RFID elements, prior art combination approaches have placed the two different elements, i.e., the EAS element and the RFID element, far enough apart in an end-to-end or side-by-side manner so as to minimize the interaction of each element. However, this requires an increase in the size of the combined tag or label.

While the use of a spiral antenna alone has its benefits, the coupling mechanism depends mainly on the electric E field and not the magnetic H field. In some instances, the overall RFID read performance is optimized for the far field and the resulting near field read performance may be limited. That is, the antenna cannot be optimized for both the far field and near field. The near field performance depends on how the antenna was designed for the far field. For combination EAS/RFID tag applications, a spiral antenna may limit the various options for near field antennas used in detachers and other POS applications where close proximity read performance is especially important.

The open antenna structure of a spiral antenna allows low frequency or static electric E field to develop a substantial voltage across the RFID chip and this can cause failure of the device if the level is high enough. Such electrostatic discharge ("ESD") can occur in the processes of label manufacturing or ultrasonic welding of the hard tag housing.

What is therefore needed is a combination EAS and RFID label or tag in which a spacer such as low loss dielectric material or air is used as the separation between the EAS and RFID elements so as to vary and control the read range of the RFID element.

What is also needed is an RFID antenna design that increases near field read performance without sacrificing far field read performance, while at the same time reducing the likelihood of chip failure due to the build up of electrostatic discharge.

SUMMARY OF THE INVENTION

The present disclosure provides a tag or label which in one tag or label combines the features of an independent EAS tag or label and an independent RFID tag or label in which a spacer such as low loss dielectric material or air is used as the separation between the EAS and RFID elements so as to vary and control the read range of the RFID element.

The present disclosure relates to a security tag including an electronic article surveillance (EAS) component having a defined surface area and a radiofrequency (RFID) component having a defined surface area. The defined surface area of the EAS component is configured to at least partially overlap the defined surface area of the RFID component. The security tag also includes a substantially planar spacer having a thickness, with the spacer at least partially disposed between the defined surface area of the EAS component and the defined surface area of the RFID component, wherein the thickness of the spacer is configurable to regulate a read range between an RFID reader and the RFID component. In one embodiment, the RFID reader is capable of activating the RFID component when the RFID component is within the read range.

The RFID component may include an antenna which at least partially overlaps the defined surface area of the EAS component. The antenna may have a complex impedance, and the EAS component forms a part of an impedance matching network of the antenna. The antenna impedance may include loading effects of the EAS component. In one embodiment, the RFID component includes the antenna and an application specific integrated circuit (ASIC), the ASIC having a complex impedance. The complex impedance of the ASIC may match a coupled complex conjugate impedance of the antenna including the loading effects of the EAS component.

In one embodiment, the security tag includes: an electronic article surveillance (EAS) component having a defined surface area; a radiofrequency identification (RFID) component having a defined surface area, the surface area of the EAS component configured to at least partially overlap the surface area of the RFID component; and a substantially planar spacer having a thickness, the spacer at least partially disposed between the defined surface area of the EAS component and the defined surface area of the RFID component, wherein the RFID component includes an antenna and an application specific integrated circuit (ASIC), the ASIC having a complex impedance, and the complex impedance of the ASIC matches a coupled complex conjugate impedance of the antenna including loading effects of the EAS component, and wherein the thickness of the spacer is configurable to regulate a read range between an RFID reader and the RFID component.

The RFID component may include a base portion, and the base portion material may be selected from the group consisting of (a) base paper, (b) polyethylene, (c) polyester; (d) polyethyleneterephthalate (PET); and (e) polyetherimide (PEI). The RFID component may include a base portion, and the base portion material may be a plastic having a dielectric constant of about 3.3 and a loss tangent of less than about 0.01. The spacer material may be selected from the group consisting of (a) a low loss, low dielectric material; and (b) air.

The present disclosure relates also to a method of regulating a read range of a combination electronic article surveillance (EAS) component and radiofrequency identification (RFID) component, the method including the steps of: providing a spacer disposed between the EAS component and the RFID component; and varying the thickness of the spacer to regulate the readable range of the RFID component. In one embodiment, the step of varying the thickness of the spacer varies the read range between an RFID reader and the RFID component, and the RFID reader is capable of activating the RFID component when the RFID component is within the read range.

In another embodiment, a security tag includes an electronic article surveillance (EAS) component having a defined surface area and a radiofrequency (RFID) component having a defined surface area. The RFID component includes an antenna inlay in which the antenna inlay has an inward spiral antenna, a magnetic loop antenna in electrical contact with the spiral antenna, and an integrated circuit in electrical contact with the loop antenna. The security tag further includes a substantially planar spacer having a predetermined thickness. The spacer is at least partially disposed between the defined surface area of the EAS component and the defined surface area of the RFID component. The thickness of the spacer is configurable to regulate a read range of the RFID component.

In another embodiment, a method of regulating a read range of a combination electronic article surveillance (EAS) component and radiofrequency identification (RFID) component is provided. The method disposes a spacer disposed between the EAS component and the RFID component, where the RFID component includes an antenna inlay having an inward spiral antenna in electrical contact with a magnetic loop antenna, and an integrated circuit in electrical contact with the loop antenna. Varying the thickness of the spacer regulates the read range of the RFID component.

In yet another embodiment, an RFID antenna inlay for use in a combination EAS/RFID security tag, is provided. The EAS/RFID security tag has an EAS component, an RFID component, and a spacer element positioned between the EAS component and the RFID component. The antenna inlay includes an inward spiral antenna having a first section and a second section and a magnetic loop antenna coupled to the spiral antenna and situated between the first section of the spiral antenna and the second section of the spiral antenna. The antenna inlay further includes an integrated circuit coupled to the magnetic loop antenna. The spacer element has a thickness, wherein the thickness of the spacer element is configurable to regulate the read range between an RFID reader and the RFID component.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION OF THE INVENTION

Figure 1:
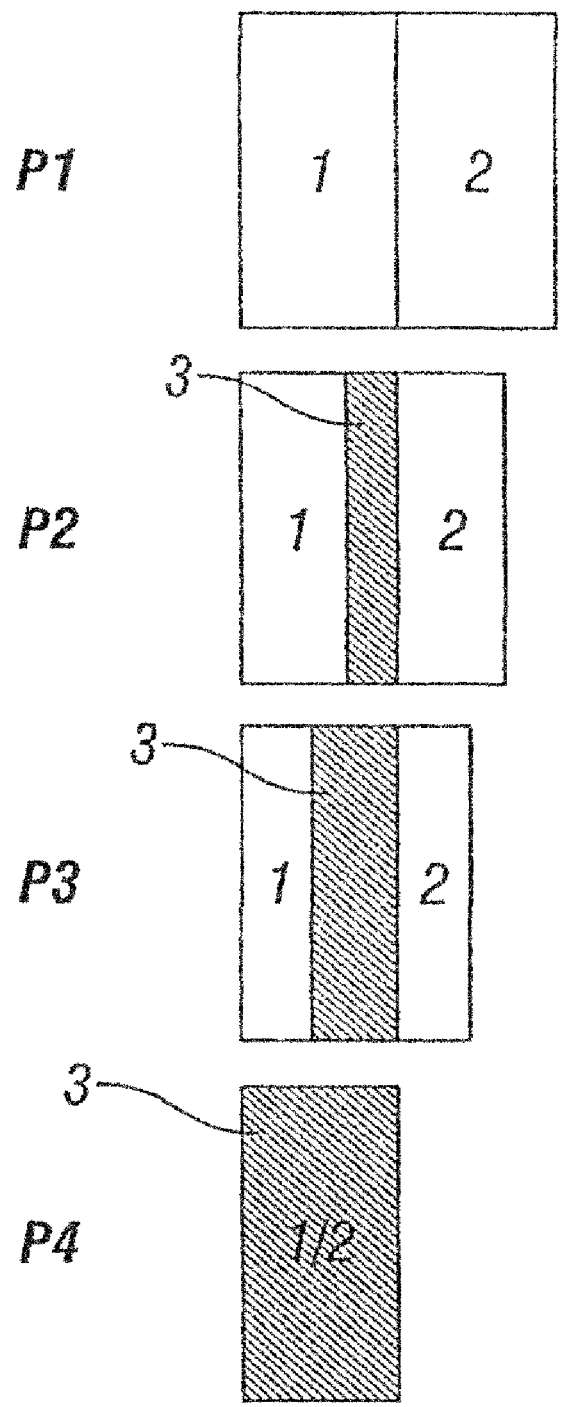
FIG. 1 illustrates a combination EAS/RFID security tag according to one embodiment of the present disclosure.

The present disclosure will be understood more fully from the detailed description given below and from the accompanying drawings of particular embodiments of the invention which, however, should not be taken to limit the invention to a specific embodiment but are for explanatory purposes.

Numerous specific details may be set forth herein to provide a thorough understanding of a number of possible embodiments of a combination EAS/RFID tag incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments disclosed herein are not necessarily limited in this context.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Turning now to the details of the present disclosure, one manner in which a combination EAS/RFID label (or tag) may be utilized is to put both the EAS related components together with the RFID related components and package them together. However, there may be some electrically or electro-mechanical interacting factors that may affect the performance of either the EAS function and/or the RFID function. Placing the RFID label on top of the EAS label is the most convenient way but may result in substantial de-tuning and signal loss for the RFID label. For example, in a typical RFID device, performance of the RFID label is typically very sensitive to impedance matching of an application specific integrated circuit (ASIC)/lead frame assembly for the RFID device to the effective impedance of an RFID antenna mounted on a substrate. A more detailed description of some possible embodiments of the RFID portion of the device is discussed further below. Other objects surrounding the RFID label may contribute to either the effective impedance or the absorption of electromagnetic energy used to read the RFID label.

Some existing 2450 MHz EAS/RFID combination labels have used a configuration where an RFID label and an EAS label are placed in an overlapped configuration. There may be considerable degradation in RFID label detection with this particular application. Although end-to-end or slight overlap has worked best in such systems, the tag size tends to become prohibitively large in these instances. Also, a side-by-side configuration has been known to create an irregular RFID detection pattern. There are not many designs which have been able to successfully implement a combination EAS/RFID tag in the marketplace. Most applications using combined EAS and RFID of tagged items use separate EAS and RFID labels that are mounted separately so that they occupy considerable space on the tagged item than either one would occupy by itself if mounted separately.

It is envisioned that the solution to this problem is the use of an EAS label portion of the combination tag as part of the impedance matching network for the RFID label. For example, as the RFID label is placed closer and closer to the EAS label, the RFID label antenna impedance is affected, or tuned, by the EAS label. In order to achieve RFID label impedance matching, the RFID antenna geometry may itself be designed so that any resulting electrical effect of the EAS label on the impedance is taken into account. For example, the RFID antenna may be configured to have a highly capacitive impedance and which may be grossly mismatched to the impedance of the logic chip for the device (e.g., an ASIC/lead frame assembly as referred to above). As the RFID label is placed proximate the EAS label e.g., directly underneath, the impedance of the RFID antenna is nearly matched to the ASIC impedance.

Figure 4:
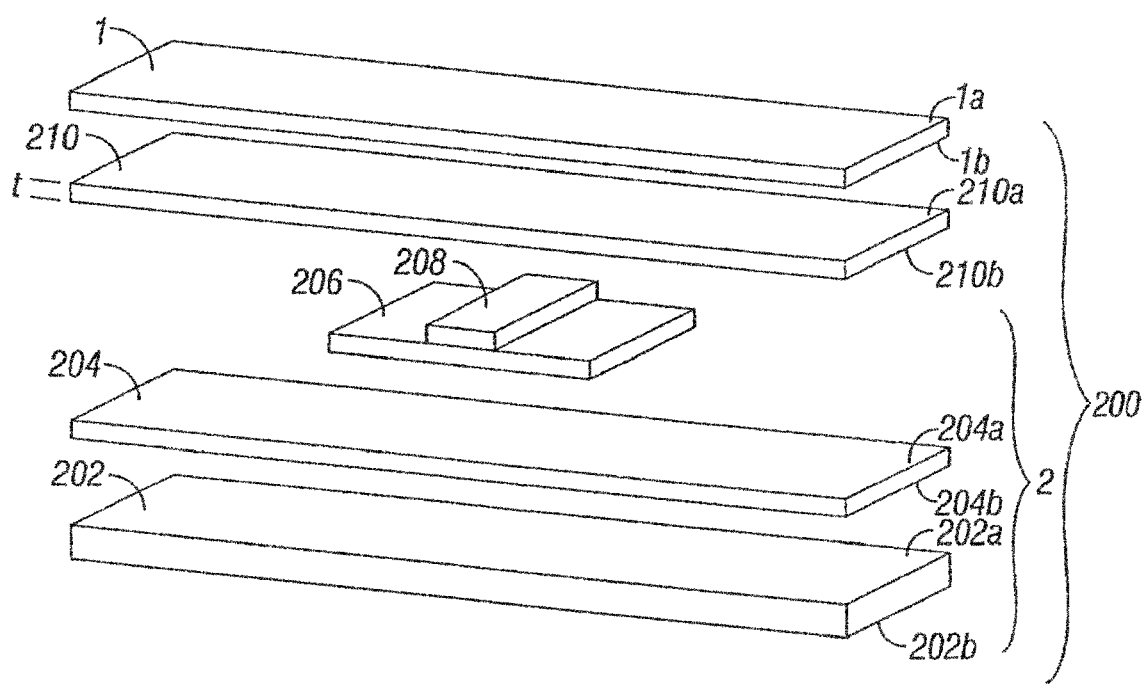
FIG. 4 illustrates a perspective exploded view of a security tag in accordance with one embodiment of the present disclosure.

FIG. 1 generally illustrates an EAS component 1 and an RFID component 2. The EAS component 1 is an EAS label or tag. EAS component 1 may contain, for example but is not limited to, a magnetic resonator element along with a bias magnet (or other EAS type resonant circuits) that is contained in a housing of plastic or some other material. Other EAS labels or tags not specifically disclosed herein may perform the function of EAS component 1. The RFID component 2 is an RFID label or tag. RFID component 2 may contain, for example and is not limited to, and for the purposes of discussion of FIG. 1, an antenna mounted on a substrate material with an ASIC based RFID logic circuit or processing chip attached to the antenna, as best shown in FIG. 4 discussed below. Other RFID labels or tags not specifically disclosed herein may perform the function of RFID component 2. In one particularly useful embodiment, the RFID portion of the system, i.e., RFID component 2, operates in the 868 MHz and/or 915 MHz ISM bands. Those of ordinary skill in the art will readily appreciate, however, that the invention is not limited thereto and may be used at any other usable frequencies.

When the EAS component 1 and the RFID component 2 are disposed adjacent one another as shown in position "P1" of FIG. 1, there is only a small effect of the EAS component 1 on the antenna impedance of RFID component 2. However, as the RFID-component 2 is positioned underneath the EAS component 1 as shown in position "P2", "P3" and "P4", i.e., the extent of the overlap shown via a shaded area 3, the RFID antenna impedance is progressively affected.

More particularly, the label positions P1-P4 of the RFID component 2 were configured as follows:
P1=EAS component 1 and RFID component 2 disposed adjacent to each other;
P2=RFID component 2 is disposed ¼ the way across and underneath the EAS-component 1;
P3=RFID component 2 is disposed ½ the way across and underneath the EAS component 1; and
P4=RFID component 2 is disposed directly underneath the EAS component 1.

Figure 2A:
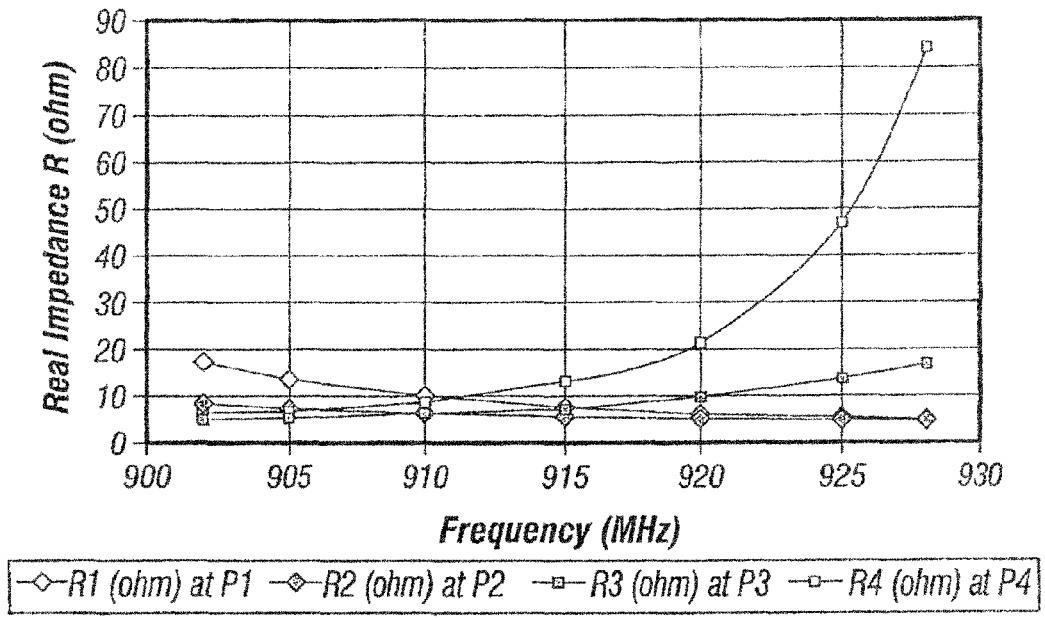
FIG. 2A illustrates one part of sample testing data for a combination EAS/RFID security tag according to one embodiment of the present disclosure.
Figure 2B:
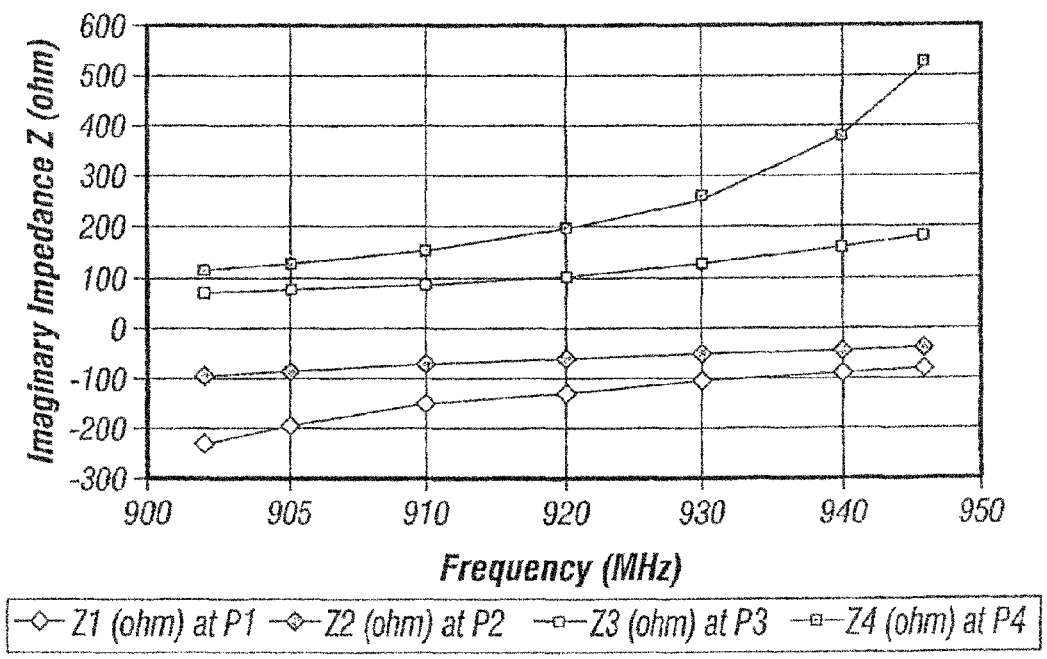
FIG. 2B illustrates another part of sample testing data for a combination EAS/RFID security tag according to one embodiment of the present disclosure.

For example, FIGS. 2A and 2B show test results of the real and imaginary components of the RFID antenna impedance vs. frequency over the 915 MHz ISM band for a sample security tag which includes EAS component 1 and RFID component 2.

As shown in FIG. 2A, at the center frequency of 915 MHz, the real impedance R varies from R1=about 6 ohms to R4=about 13 ohms as the RFID label 2 moves from the position P1 to position P4. This apparent increase in the real impedance R represents the effective loss increase due to the EAS label materials. Correspondingly, the imaginary impedance Z changes from Z1=−125 ohms to Z4=+195 ohms as the RFID label 2 moves from position P1 to position P4. Therefore the imaginary impedance Z changes from somewhat capacitive nature to inductive nature.

The RFID component 2 may be designed so that the antenna impedance is approximately the complex conjugate of the ASIC device. This results in resonance at a target frequency, such as 915 MHz for example. Typical test results for the impedance of the ASIC RFID devices for chips made by ST Microelectronics of Geneva, Switzerland with lead frame used in this example are 5−j140 ohms, and for chips made by Koninklikje Philips Electronics N.V. of Amsterdam, the Netherlands, with lead frame used in this example, are 20−j 270 ohms. It was necessary for the RFID label antenna imaginary impedance Z to be in the range of +j (140 to 270) ohms for these two RFID devices to achieve resonance at the target frequency.

Therefore, a combination RFID/EAS security tag can be designed using the impedance of the EAS component for matching purposes. In free space, the RFID component antenna can be designed to have a negative imaginary impedance and achieve the correct positive imaginary impedance when placed directly beneath, atop or nearby the EAS component. As can be appreciated by the present disclosure, this configuration may be used with any type of EAS tag or label, such as, for example, various types of adhesive magnetostrictive labels and EAS hard tags, such as the SuperTag® produced by Sensormatic Corporation, a division of Tyco Fire and Security, LLC of Boca Raton, Fla. The types of EAS devices are not limited to these specific examples.

The RFID component may include, for example, a semiconductor integrated circuit (IC) and a tunable antenna. The tunable antenna may be tuned to a desired operating frequency by adjusting the length of the antenna. The range of operating frequencies may vary, although the embodiments may be particularly useful for ultra-high frequency (UHF) spectrum. Depending upon the application and the size of the area available for the antenna, the antenna may be tuned within several hundred Megahertz (MHz) or higher, such as 868-950 MHz, for example. In one embodiment, for example, the tunable antenna may be tuned to operate within an RFID operating frequency, such as the 868 MHz band used in Europe, the 915 MHz Industrial, Scientific and Medical (ISM) band used in the United States, and the 950 MHz band proposed for Japan. It is again noted that these operating frequencies are given by way of example only, and the embodiments are not limited in this context.

In one embodiment, for example, the tunable antenna may have a unique antenna geometry of an inwardly spiral pattern useful for RFID applications or EAS applications. The inwardly spiral pattern may nest the antenna traces thereby bringing the traces back towards the origin. This may result in an antenna similar in functionality to that of a conventional half-wave dipole antenna, but with a smaller overall size. For example, the size of a conventional half-wave dipole antenna at 915 MHz would be approximately 16.4 centimeters (cm) long. By way of contrast, some embodiments may offer the same performance as the conventional half-wave dipole antenna at the 915 MHz operating frequency with a shorter length of approximately 3.81 cm. Furthermore, the ends of the antenna traces may be modified to tune the antenna to a desired operating frequency. Since the ends of the antenna traces are inward from the perimeter of the antenna, the tuning may be accomplished without changing the geometry of the antenna.

Figure 3A:
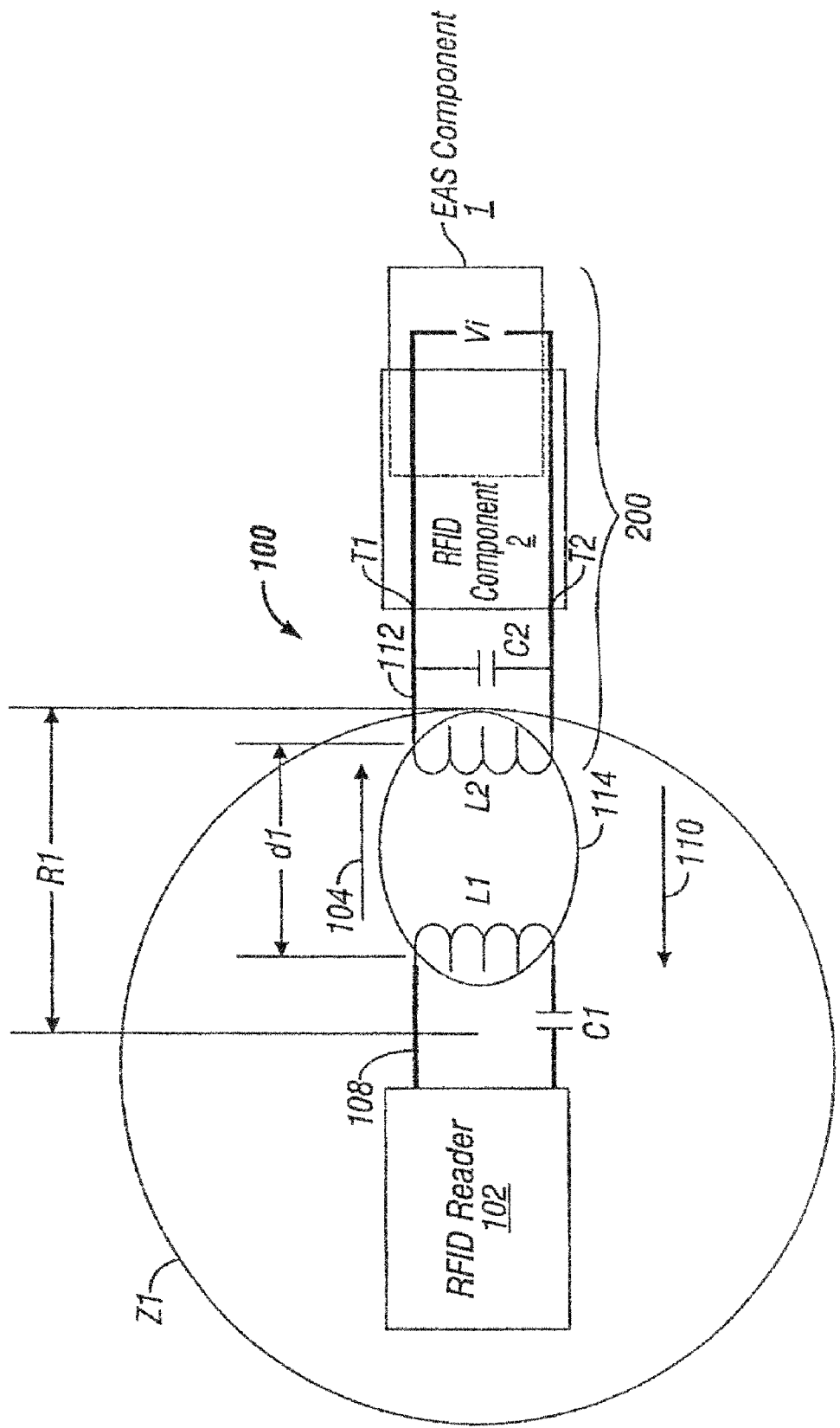
FIG. 3A illustrates an RFID system using magnetic field coupling in accordance with one embodiment of the present disclosure.

FIG. 3A shows a first system in accordance with one particularly useful embodiment of the present disclosure. FIG. 3A shows an RFID system 100 which may be configured to operate using RFID component 2 having an operating frequency in the high frequency (HF) band which is considered to be frequencies up to and including 30 MHz. In this frequency range, the primary component of the electromagnetic field is magnetic. RFID system 100, however, may also be configured to operate RFID component 2 using other portions of the RF spectrum as desired for a given implementation. The embodiments are not limited in this context. As illustrated by way of example, RFID component 2 partially overlaps EAS component 1.

RFID system 100 may include a plurality of nodes. The term "node" as used herein may refer to a system, element, module, component, board or device that may process a signal representing information. The signal type may be, for example but not limited to, electrical, optical, acoustical and/or a chemical in nature. Although FIG. 3A shows a limited number of nodes, it can be appreciated that any number of nodes may be used in RFID system 100. The embodiments are not limited in this context.

Referring first to FIG. 4, FIG. 4 illustrates a side view for a security tag 200 in accordance with one particularly useful embodiment of the present disclosure. RFID component 2 includes a base portion or substrate 202 having a first surface or surface area 202a and a second surface or surface area 202b which are typically on opposing sides of base portion or substrate 202. An antenna 204 is disposed on the substrate 202. The antenna 204 has a first surface or surface area 204a and a second surface or surface area 204b which are typically on opposing sides of antenna 204. A lead frame 206 is disposed on the antenna 204, and an application specific semiconductor integrated circuit (ASIC) 208 is disposed on the lead frame 206. First and second surfaces or surface areas 202a and 202b, 204a and 204b are defined surface areas of RFID component 2.

The security tag 200 includes a substantially planar covering material or spacer 210 disposed on the RFID component 2 and EAS component 1 disposed on the spacer 210. The spacer 210 has surfaces or surface areas 210a and 210b disposed on opposite sides thereof.

EAS component 1 has a first surface or surface area 1a and a second surface or surface area 1b which are typically on opposing sides of EAS component 1. First and second surfaces or surface areas 1a and 1b are defined surfaces or surface areas of EAS component 1.

For reference purposes, security tag 200 is illustrated as being disposed directly underneath EAS component 1, i.e., in position P4 of FIG. 1. The security tag 200 is shown in position P4 by way of example only and may be disposed in any position with respect to EAS label 1, as discussed previously with respect to FIG. 1. Security tag 200 may also be utilized completely independently of EAS label 1 or in conjunction therewith. The embodiments are not limited in this context.

More particularly, security tag 200 includes an EAS component 1 having one of the defined surface areas 1a and 1b and an RFID component 2 having one of the defined surface or surface areas 202a, 202b, 204a and 204b. At least one of the defined surface or surface areas 1a and 1b of the EAS component 1 is configured to at least partially overlap at least one of the defined surface or surface areas 202a, 202b, 204a and 204b of the RFID component 2. The RFID component 2 may include antenna 204 which at least partially overlaps at least one of the defined surfaces or surface areas 1a and 1b of the EAS component 1.

In one embodiment, the defined surface or surface area of the RFID component 2 is one of surface or surface area 202a and 202b.

The substantially planar spacer 210 has a thickness "t" and is at least partially disposed between at least one of the defined surfaces or surface areas 1a and 1b of the EAS component 1 and at least one of the defined surfaces or surface areas 202a, 202b, 204a, and 204b of the RFID component 2.

Although FIG. 4 illustrates a limited number of elements, it may be appreciated that a greater or lesser number of elements may be used for security tag 200. For example, an adhesive and release liner may be added to security tag 200 to assist in attaching security tag 200 to an object to be monitored. Those skilled in the art will recognize that semiconductor IC 208 may be directly bonded to antenna 204 without the lead frame 206.

Returning now to FIG. 3A, RFID system 100 may also include an RFID reader 102 and security tag 200. Security tag 200 is physically separated from RFID reader 102 by a distance d1. As is explained below with respect to FIG. 4, security tag 200 is an RFID security tag, tag or label which differs over the prior art in that it includes an EAS component, i.e., an EAS label or tag. RFID component 2 includes a resonant circuit 112. Resonant circuit 112 includes inductor coil L2 with a resonating capacitor C2 across the terminals T1 and T2 of ASIC 208. The capacitance of ASIC 208 is usually negligible compared to C2. If necessary to add additional capacitance to the resonant circuit 112 to enable tuning the antenna, i.e., inductor coil 112, to the proper frequency, a capacitor C2 is connected in parallel to inductor coil L2 so that resonant circuit 112 becomes a parallel resonant circuit having terminals T1 and T2 across which an induced voltage V1 may be formed. As is explained below with respect to FIG. 4, terminals T1 and T2 are coupled to other portions of the RFID component 2. In addition, the inductance value of inductor coil or antenna L2 includes the inductance presented by the EAS label or tag.

RFID reader 102 may include a tuned circuit 108 having an inductor L1 which serves as an antenna for RFID reader 102. Where necessary to add additional capacitance to the tuned circuit 108 to enable proper tuning of the inductor coil or antenna L1, a capacitor C1 is connected in series with inductor coil or antenna L1. RFID reader 102 is configured to produce a pulsed or continuous wave (CW) RF power across the tuned circuit 108 which is electro-magnetically coupled by alternating current action to parallel resonant circuit antenna 112 of RFID component 2. The mutually coupled electro-magnetic power from RFID component 2 is coupled to RFID reader 102 through a magnetic field 114.

RFID component 2 is a power converter circuit that converts some of the coupled CW RF electro-magnetic power of magnetic field 114 into direct current signal power for use by the logic circuits of the semiconductor IC used to implement the RFID operations for RFID component 2.

RFID component 2 may also be a RFID security tag which includes memory to store RFID information and which communicates the stored information in response to an interrogation signal 104. RFID information may include any type of information capable of being stored in a memory used by RFID component 2. Examples of RFID information include a unique tag identifier, a unique system identifier, an identifier for the monitored object, and so forth. The types and amount of RFID information are not limited in this context.

RFID component 2 may also be a passive RFID security tag. A passive RFID security tag does not use an external power source, but rather uses interrogation signals 104 as a power source. A detection zone Z1 is defined as an imaginary volume of space bounded by a generally spherical surface having a radius R1 generally originating from the inductor L1. The radius R1 defines a detection distance or read range R1 such that if distance d1 is less than or equal to read range R1, the RFID reader 102 induces a required threshold voltage $V_T$ across terminals T1 and T2 to activate the RFID component 2. The read range R1 depends on, among other factors, the strength of the EM field radiation and magnetic field 114 from the tuned circuit 208. Therefore, the strength of the EM field radiation 114 determines the read range R1.

RFID component 2 may be activated by a direct current voltage that is developed as a result of rectifying the incoming RF carrier signal including interrogation signals 104. Once RFID component 2 is activated, it may then transmit the information stored in its memory register via response signals 110.

In general high frequency (HF) operation, when resonant circuit 112 of RFID system 100 is in proximity to tuned circuit 108 of RFID reader 102, an alternating current (AC) voltage $V_i$ is developed across the terminals T1 and T2 of parallel resonant circuit 112 of RFID component 2. The AC voltage $V_i$ across resonant circuit 112 is rectified by a rectifier to a direct current (DC) voltage and when the magnitude of the rectified voltage reaches a threshold value $V_T$, RFID component 2 is activated. The rectifier is the aforementioned application specific integrated circuit (ASIC) 208. Once activated, the RFID component 2 sends stored data in its memory register by modulating interrogation signals 104 of RFID reader 102 to form response signals 110. The RFID device 106 then transmits the response signals 110 to the RFID reader 102. RFID reader 102 receives response signals 110 and converts them into a detected serial data word bitstream of data representative of the information from RFID component 2.

The RFID system 100 as illustrated in FIG. 3A may be considered to be a high frequency (HF) RFID system because the RFID reader 102 couples inductively to the RFID component 2 via magnetic field 114. In HF applications, antenna 204 is typically an inductance coil type antenna as provided by inductance coil L2.

Figure 3B:
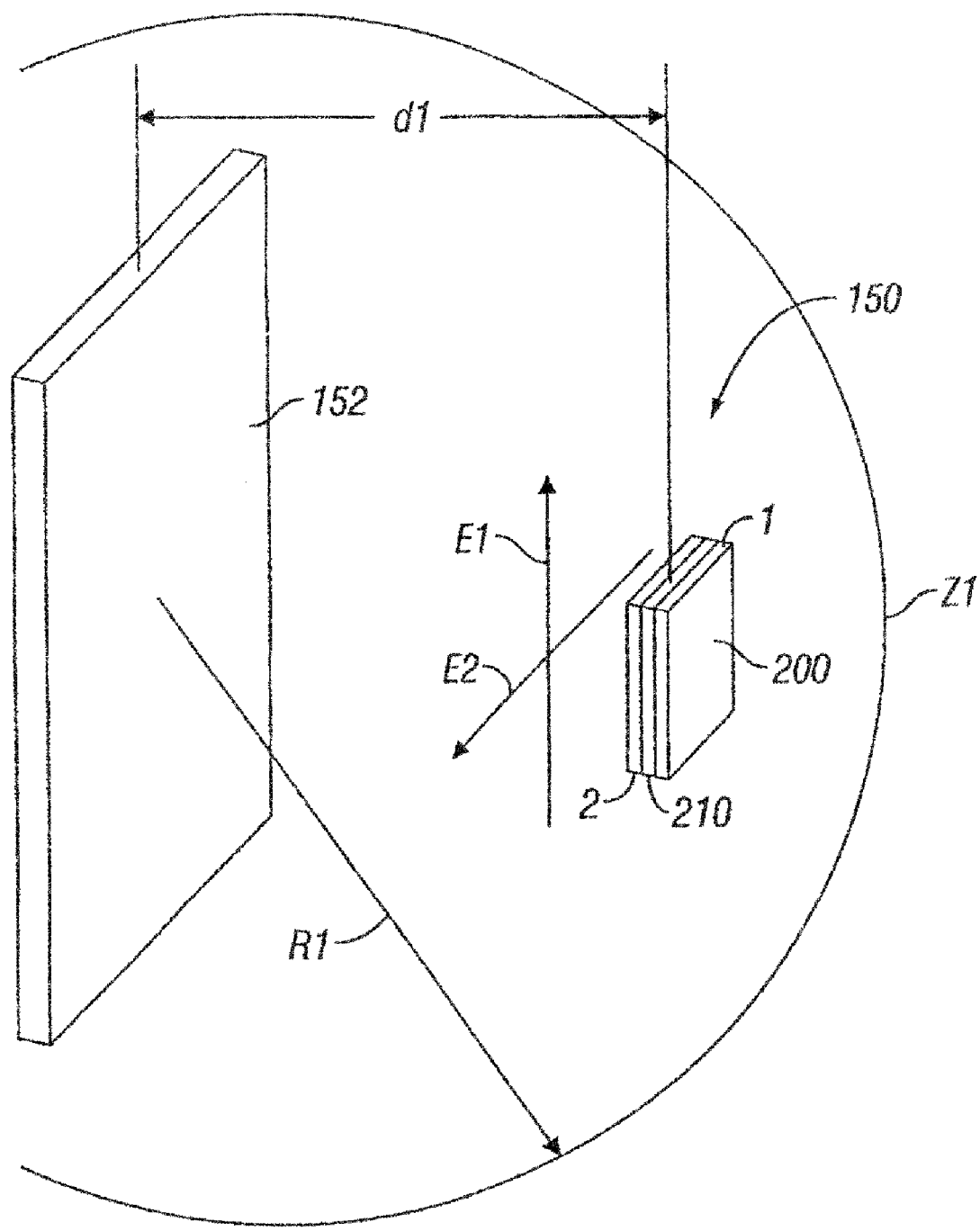
FIG. 3B illustrates an RFID system using electric field coupling in accordance with one embodiment of the present disclosure.

FIG. 3B illustrates an ultrahigh frequency (UHF) RFID system 150 in which an RFID reader 152 couples to an RFID device, tag or label 156 at a distance d2 away via an electric field E. The frequency band for UHF is considered herein to range from about 300 MHz to about 3 GHz. The UHF range specifically includes frequencies in the 868 MHz band, the 915 MHz band, and the 950 MHz band.

For UHF applications, antenna 204 of RFID component 2 typically includes a UHF open-ended dipole antenna while the RFID reader 152 typically includes a patch antenna. A coaxial feed line from the reader 152 is connected to the patch antenna. The UHF antenna may be a simple half-wave dipole or a patch antenna. Many popular designs use an air filled cavity backed patch antenna which can be either linearly polarized or circularly polarized. The electric field vectors E1 and E2 rotate with equal magnitude for the circularly polarized case. The linearly polarized antenna has higher magnitudes of E field in certain orthogonal orientations, which may be suitable for certain RFID label orientations.

Therefore, in UHF applications, the antenna 204 of RFID component 2 includes an open-ended dipole antenna while in HF applications, is typically inductor L2.

In general, when operating in the UHF range, it is not necessary for the RFID component 2 to include a capacitor such as C2 in parallel with the open-ended dipole antenna 204 to enable tuning to the frequency transmitted by the patch antenna of RFID reader 152.

Returning to FIG. 4, as previously noted, RFID component 2 may include a base portion or substrate 202 which includes any type of material suitable for mounting antenna 204, lead frame 206, and IC 208. For example, material for substrate 202 may include base paper, polyethylene, polyester, polyethyleneterephthalate (PET), polyetherimide (PEI) (e.g., ULTEM® amorphous thermoplastic PEI sold by the General Electric Co. of Fairfield, Conn.) and/or other materials. It is known that the particular material implemented for substrate 202 may impact the RF performance of security tag 200 and, as such, the dielectric constant and the loss tangent may characterize the dielectric properties of an appropriate substrate material for use as substrate 202.

In general, a higher dielectric constant may cause a larger frequency shift of an antenna when compared to free space with no substrate present. Although it may be possible to re-tune the antenna to the original center frequency by physically changing the antenna pattern, it may be desirable to have a material with a high dielectric constant and with a low dielectric loss since usage of such a material results in a smaller tag or label size. The term "read range" may refer to the communication operating distance between RFID reader 102 and security tag 200. An example of a read range for security tag 200 may range from 1-3 meters, although the embodiments are not limited in this context. The loss tangent may characterize the absorption of RF energy by the dielectric. The absorbed energy may be lost as heat and may be unavailable for use by ASIC 208. The lost energy may result in the same effect as reducing the transmitted power and may reduce the read range accordingly. Consequently, it may be desirable to have the lowest loss tangent possible in substrate 202 since it cannot be "tuned out" by adjusting antenna 204. The total frequency shift and RF loss may depend also on the thickness of substrate 202. As the thickness increases, the shift and loss may also increase.

In one embodiment, for example, substrate 202 may be configured using base paper having a dielectric constant of about 3.3, and a loss tangent of about 0.135. The base paper may be relatively lossy at 900 MHz. A lossy material has a dielectric loss factor greater than about 0.01. In one embodiment, substrate 202 may be configured of plastic having a dielectric constant of about 3.3 and a loss tangent of less than about 0.01. The embodiments are not limited in this context.

In one embodiment, security tag 200 may include IC 208 having a semiconductor IC, such as an RFID chip or application specific integrated circuit (ASIC) ("RFID chip"). RFID chip 208 may include, for example, an RF or alternating current (AC) rectifier that converts RF or AC voltage to DC voltage, a modulation circuit that is used to transmit stored data to the RFID reader, a memory circuit that stores information, and a logic circuit that controls overall function of the device. In one embodiment, RFID chip 208 may be configured to use an I-CODE High Frequency Smart Label (HSL) RFID ASIC or a U-CODE Ultrahigh Frequency Smart Label (USL) RFID ASIC, both of which are made by Philips Semiconductor of Amsterdam, the Netherlands, or an XRA00 RFID chip made by ST Microelectronics of Geneva, Switzerland. The embodiments, however, are not limited in this context.

Lead frames are small connections which enable attaching an RFID chip such as RFID chip 208 to an antenna such as antenna 204. In one embodiment, RFID chip 208 may be directly bonded to antenna 204 without including lead frame 206. Lead frame 206 may also include a die mounting paddle or flag, and multiple lead fingers. The die paddle primarily serves to mechanically support the die during package manufacture. The lead fingers connect the die to the circuitry external to the package. One end of each lead finger is typically connected to a bond pad on the die by wire bonds or tape automated bonds. The other end of each lead finger is the lead, which is mechanically and electrically connected to a substrate or circuit board. Lead frame 206 may be constructed from sheet metal by stamping or etching, often followed by a finish such as plating, downset and taping. In one embodiment, for example, lead frame 206 may be implemented using a Sensormatic EAS Microlabel™ lead frame made by Sensormatic Corporation, a division of Tyco Fire and Security, LLC, of Boca Raton, Fla., for example. The embodiments, however, are not limited in this context.

In one embodiment, antenna 204 includes the inductor coil L2, and when required, the capacitor C2, of resonant circuit 112 of RFID component 2. The terminals T1 and T2 are also included in antenna 204 to couple to the RFID chip 208 to enable the induced voltage V1 to activate the RFID component 2 once the threshold voltage $V_T$ is reached.

In one embodiment, antenna 204 includes typically the open ended dipole antenna of RFID component 2 for UHF applications. Terminals T1 and T2 may also be included in antenna 204 to couple to the RFID chip 208 to enable the electric field E to excite the antenna of reader 152

In one embodiment, security tag 200 may also include covering or spacer material 210 applied to the top of a finished security tag. As with substrate 202, covering or spacer material 210 may also impact the RF performance of RFID component 2. For example, covering material 210 may be implemented using cover stock material having a dielectric constant of about 3.8 and a loss tangent of about 0.115. The embodiments are not limited in this context.

More particularly, as previously mentioned, the substantially planar spacer 210 has a thickness "t". The thickness "t" is generally about 1 mm to 2 mm when the security tag 200 is a hard combination tag and considerably less than 1 mm when the security tag 200 is a combination label. As previously mentioned, the spacer 210 has surfaces or surface areas 210a and 210b disposed on opposite sides thereof. In one embodiment, spacer surfaces or surface areas 210a and 210b are parallel to each other. EAS component 1 at least partially overlaps at least one of the spacer surfaces or surface areas 210a and 210b.

An RFID insert is a term common in the art and may be defined herein as the RFID component 2, which includes the combination of substrate 202, antenna 204, lead frame 206 if applicable, and RFID chip 208. RFID component 2 at least partially overlaps another one of the spacer surfaces 210b. Security tag 200 includes RFID insert or component 2 and spacer 210.

Security tag 200 may also include antenna 204. Antenna 204 may be representative of, for example, antenna 112 of RFID device 106 or antenna 204 may be formed by a parallel resonant LC circuit, where L is inductance and C is capacitance. Alternatively, antenna 204 may also be a tunable antenna which is tuned to the carrier signal so that the voltage across the antenna circuit is maximized. As can be appreciated this will increase the read range of antenna 204. It is known that the degree of preciseness of the tuning circuit is related to the spectrum width of the carrier signal transmitted by transmitter 102. For example, in the United States, the Federal Communication Commission currently (FCC) regulates one band of the RFID security tag spectrum to 915 MHz. Therefore, transmitter 102 should transmit interrogation signals 104 at approximately 915 MHz. To receive interrogation signals 104, antenna 204 should be narrowly tuned to the 915 MHz signal. For 915 MHz applications, the RFID tag antenna 204 may be printed, etched or plated.

The EAS label 1 creates or presents a constant load impedance to RFID component 2. As a result, antenna 204 of RFID label 200 uses this constant load of EAS label 1 for impedance matching. More particularly, antenna 204 has a complex impedance and the EAS component 1 forms a part of an impedance matching network of the antenna. Therefore, the impedance of antenna 204 includes the loading effect of the EAS component 1. That is, the loading effects of the EAS component 1 are the constant load impedance of the EAS component 1. The loading effect of EAS component 1 may be varied by substituting or exchanging one material included within the EAS component 1 having one dielectric constant and loss tangent for another material having another dielectric constant and loss tangent.

The RFID component chip 208 may be represented as an equivalent series RC circuit, where R represents a resistor and C represents a capacitor. This circuit is represented by a complex impedance $Z_{chip}$ as $$Z_{chip} = Z_1 - jZ_2,$$

where $Z_1$ and $Z_2$ are the real and imaginary components of the impedance of the chip 208. The RFID device tag or label antenna 204 may be represented by a complex impedance $Z_{antenna}$ as $$Z_{antenna} = Z_3 + jZ_4 \quad (1)$$

where Z3 and Z4 are the real and imaginary components of the impedance of the antenna 204. When the chip 208 is mounted on the antenna 204, the complex impedance of chip 208 is matched to the coupled conjugate impedance of the RFID antenna 204, including the impedance matching effect or loading effect of the EAS component or label 1. This allows maximum power coupling to the RFID chip 208 which results in the greatest read range R1.

In one embodiment, thickness "t" of spacer 210 may be varied to vary with respect to either the RFID reader device 102 or to the RFID reader device 152 in order to vary the read range R1, respectively. More particularly, thickness "t" determines the read range, i.e., the maximum distance R1 between the security tag 200 and the EAS/RFID reader 102 or the EAS/RFID reader 152 at which the reader 102 or 152 may interrogate the security tag 200. The read range R1 is affected adversely as thickness "t" decreases. Conversely, the read range R1 increases as thickness "t" increases.

Figure 4A:
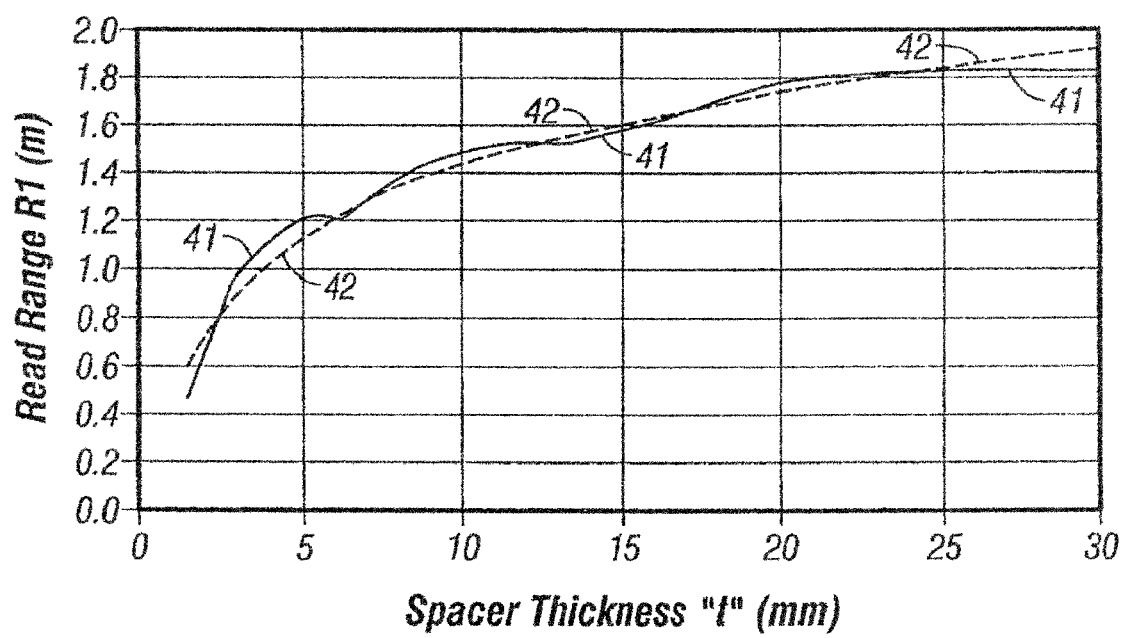
FIG. 4A illustrates sample test data for the read range of the security tag of FIG. 4 as a function of thickness of a spacer between EAS and RFID components of the security tag.

Referring to FIGS. 4 and 4A, FIG. 4A shows actual and curve-fit data 41 and 42, respectively, for a security tag such as security tag 200 consisting of an EAS element such as EAS component 1 and an RFID element such as RFID component 2 in a hard tag housing (such as housing 812 in FIG. 8D or housing 818 in FIG. 8F, discussed below). Spacer 210 is disposed between EAS component 1 and RFID component 2 and which may be made from a low loss, low dielectric material or an air gap. In the particular case of the data illustrated in FIG. 4A, the spacer 210 is an air gap. The y-axis displays the read range R1 in meters (m), while the x-axis displays thickness "t" of the spacer such as spacer 210 in millimeters (mm). The actual data 41 and the curve-fit data 42 show that as the thickness "t" of the spacer is increased to 20 mm or more, the read range R1 is essentially constant at about 1.8 meters. As the spacer thickness "t" is decreased to a value of about 3 mm, the read range R1 decreases to about 1 meter. The read range R1 continues to decrease with reduced spacer thickness "t" as the losses in the EAS component 1 become larger with decreased spacer thickness "t".

As previously described with respect to FIG. 4, in combination EAS and RFID tag or label 200, the EAS component 1 and the RFID component 2 are at least partially overlapped and the EAS component 1 is part of the impedance of the RFID antenna 204. In addition, referring to FIGS. 3A, 3B and 4, the spacer 210, and corresponding thickness "t", between the RFID component 2 and the EAS component 1 may then used to determine the read range R1 of the RFID component 2 from RFID reader 102. Furthermore, the thickness "t" may be varied to establish the read range R1 at various preferred levels depending upon the particular application. Therefore, the spacer 210 and corresponding thickness "t" determine the read range R1 and function as a control element for the combination EAS and RFID tag or label 200, or in other words, the thickness "t" of the spacer 210 is configurable to regulate the read range R1 between the RFID reader 102 and the RFID component 2.

Since the data presented in FIG. 4A are specifically for a case wherein the spacer 210 is an air gap, it will be recognized that the relationship between read range R1 versus spacer 210 thickness "t" will be different for cases where other low loss, low dielectric materials are selected for the spacer 210.

It should be noted that reader 102 for HF applications and reader 152 for UHF either read only the EAS component 1 or only the RFID component 2 such that the EAS component 1 is read by a dedicated EAS reader while RFID component 2 is read by a dedicated RFID reader. Alternatively, reader 102 and reader 152 may be combined in the same housing or their functions integrated to be performed by the same hardware. Undesirable interference between the reading of EAS component 1 and the reading of RFID component 2 is prevented or minimized because of the wide discrepancy between the range of read frequencies common to EAS components as opposed to the range of read frequencies common to RFID components, with the EAS components typically being read at frequencies in the range of less than or equal to 8.2 KHz, whereas RFID components are typically being read at frequencies in the range of 13 MHz or greater.

However, it is envisioned that since security tags 200 and 400 are stand alone devices, security tags 200 and 400 provide an EAS function and an RFID function independently of the type of reader or readers or particular frequencies to which security tags 200 or 400 are subjected.

The spacer 210 is made using a low loss, low dielectric material such as ECCOSTOCK® RH rigid foam, made by Emerson Cuming Microwave Products, Inc. of Randolph, Mass., or any other similar material. The embodiments are not limited in this context. When made from one of the foregoing materials, the read range is about 30.5 to 61.0 cm (1 to 2 feet) when the thickness "t" of spacer 902 is about 0.0762 mm (0.003 inches). Similarly, the read range is about 127 cm (5 feet) when the thickness "t" of spacer 210 is at least 1.02 mm (0.040 inches).

In one embodiment, the spacer 210 may be a thin film having a thickness "t" of about 0.05 mm where EAS component 1 directly overlaps RFID component 2.

In one embodiment, the spacer may be air where the EAS label 1 is supported mechanically away from the RFID component 2.

As a result, security tag 200 provides significant advantages over the prior art by enabling a combined EAS/RFID devices of significantly lower space or volume and lower cost.

In one embodiment, security tag 200 may use an induced voltage from a coil antenna for operation. This induced AC voltage may be rectified to result in a DC voltage. As the DC voltage reaches a certain level, the RFID component 2 begins operating. By providing an energizing RF signal via transmitter 102, RFID reader 102 can communicate with a remotely located security tag 200 that has no external power source such as a battery.

Since the energizing and communication between the RFID reader and RFID component 2 is accomplished through antenna 204, antenna 204 may be tuned for improved RFID applications. An RF signal can be radiated or received effectively if the linear dimension of the antenna is comparable with the wavelength of the operating frequency. The linear dimension, however, may be greater than the available surface area available for antenna 204. Therefore, it may prove difficult to utilize a true full size antenna in a limited space which is true for most RFID systems in HF applications. Accordingly, it is contemplated that RFID component 2 may use a smaller LC loop antenna circuit that is arranged to resonate at a given operating frequency. The LC loop antenna may include, for example, a spiral coil and a capacitor. The spiral coil is typically formed by n-turns of wire, or n-turns of a printed or etched inductor on a dielectric substrate.

For HF applications, in order to achieve good RFID coupling, the loop area*turns product and resonant frequency need to be optimized. In one embodiment of the present disclosure illustrated in FIG. 3A, the resonant frequency can be effected by tuning the parallel capacitor C2 of the resonant circuit 112 including the effects on impedance of the EAS label 1 and of the RFID chip 208.

In either HF or UHF applications, for the particular frequency of interest, the RFID chip complex impedance must be matched by the complex conjugate impedance of the antenna including the loading effects on impedance of the EAS label. In the HF case, a resonating capacitor is commonly used to tune the frequency. This capacitor is usually larger than the RFID chip capacitance and will dominate the response. For the UHF case, the RFID chip complex impedance contains only the chip capacitance for tuning.

In another embodiment according to the present disclosure, antenna 204 may be designed so that the complex conjugate of the overall antenna matches the impedance to the complex impedance of lead frame 206 and IC 208 at the desired operating frequency, e.g., 915 MHz. When RFID security tag 200 is placed on an object to be monitored, however, it has been observed that the resulting operating frequency may change, i.e., each object may have a substrate material with dielectric properties affecting the RF performance of antenna 204. In other words and as with substrate 202, the object substrate may cause frequency shifts and RF losses determined by the dielectric constant, loss tangent, and material thickness. Examples of different object substrates may include so called "chip board" (i.e., material used for item-level cartons, corrugated fiber board which is material used for corrugated boxes), video cassette and digital video disc (DVD) cases, glass, metal, etc. It is contemplated that each object substrate may have a significant effect on the read range R1 for security tag 200.

Antenna 204 may be tunable to compensate for such variations. In other words, since the dielectric constant for many materials is greater than one, the operating frequency is typically lowered when security tag 200 is attached to an object substrate. In order to establish the original frequency, antenna 204 is typically altered in some manner, otherwise detection performance and read range may be reduced. As such, antenna 204 may be altered by trimming the ends of antenna 204 by severing the antenna conductor and isolating the resultant trimmed antenna segment from the ends that were cut away. The trimmed ends do not necessarily have to be removed to allow the tuning operation. Consequently, continuous tuning of antenna 204 to the desired operating frequency is possible to allow operation of security tag 200 when security tag 200 is attached to different objects. Security tag 200 in general, and antenna 204 in particular, are described in more detail below with reference to FIGS. 5-7.

Figure 5:
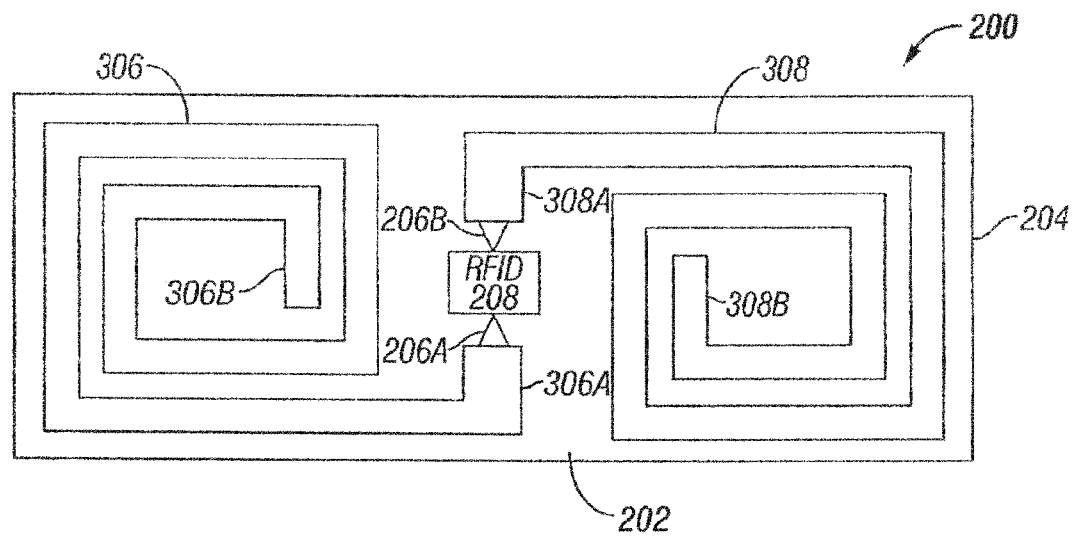
FIG. 5 illustrates a top view of the security tag of FIG. 4.

FIG. 5 illustrates a top view of a partial security tag 200 with an antenna in accordance with one embodiment according to the present disclosure which is particularly suitable for UHF applications. Security tag 200 includes antenna 204 disposed upon substrate 202 which is substantially rectangular in shapes. In one envisioned embodiment, antenna 204 is disposed on substrate 202 by die-cutting the label antenna pattern onto substrate 202.

RFID chip 208 may be connected to lead frame 206 by ultrasonically bonding lead frame 206 to the conductive pads on RFID chip 208. In the particular embodiment of FIG. 5, RFID chip 208 and lead frame 206 are placed in the geometric center of the dielectric substrate material of substrate 202. The ends of lead frame 206 are mechanically and electrically bonded to the foil antenna pattern of antenna 204. Covering material 210 (not shown) is applied over the entire top surface of security tag 200 to protect the assembly and provide a surface for printing indicia if desired. It is known in the art to use an anisotropic electrically conductive thermally setting adhesive to bond the RFID chip 208 to the antenna 204. An example of such an adhesive is Loctite 383® made by the Henkel Loctite Corporation of Rocky Hill, Conn. Antenna 204 may also include multiple antenna portions. For example, antenna 204 may include a first antenna portion 306 and a second antenna portion 308, the first antenna portion 306 being connected to a first side 206A of lead frame 206, and the second antenna portion 308 connected to a second side 206B of lead frame 206. Therefore, antenna 204 is the entire RFID tag antenna which is subdivided into first antenna portion 306 and second antenna portion 308.

First antenna portion 306 may have a first antenna end 306A and a second antenna end 306B. Similarly, second antenna portion 308 may have a first antenna end 308A and a second antenna end 308B. In one embodiment and as shown in FIG. 5, first antenna end 306A of first antenna portion 306 is connected to lead frame 206A. First antenna portion 306 is disposed on substrate 202 to form an inwardly spiral pattern from RFID chip 208 in a first direction, with second antenna end 306B positioned to terminate on the inner loop of the inwardly spiral pattern. Similarly, first antenna end 308A of second antenna portion 308 may be connected to lead frame 206B. Second antenna portion 308 is also disposed on substrate 202 to form an inwardly spiral pattern from RFID chip 208 in a second direction, with second antenna end 308B positioned to terminate on the inner loop of the inwardly spiral pattern.

In one embodiment, the antenna geometry of antenna 204 is configured to traverse around the perimeter of substrate 202 and spiral inwardly. It is envisioned that the inwardly directed spiral antenna pattern may provide several advantages:

(1) The ends of antenna 204 may be placed well inside the perimeter of substrate 202. Placing the ends of antenna 204 within the perimeter of substrate 202 may allow the ends to be trimmed without changing the amount of area used by antenna 204;

(2) The Q factor of antenna 204 may be optimized so that the response of security tag 200, including the effects of spacer 210 and EAS label 1, only varies by approximately −3 dB at the ISM band limits. Using the Chu-Harrington limit of $Q=1/(ka)^3+1/(ka)$, where $k=2\pi/\lambda$ and "a" is a characteristic dimension of antenna 204, it can be seen that a sphere of radius "a" could just enclose security tag 200. For a high Q factor, then "ka" should be ≪1. Therefore, by maximizing Q, "a" is minimized to fall within the operating frequency band limits. The tuning of antenna 204 for UHF applications is disclosed in further detail in co-pending, commonly owned U.S. patent application Ser. No. 10/917,752 by R. Copeland and G. M. Shafer filed on Aug. 13, 2004 and entitled "TUNABLE ANTENNA".

Antenna 204 may also be tuned particularly for UHF applications to a desired operating frequency by modifying a first length for first antenna portion 306, and a second length for second antenna portion 308, after these antenna portions are disposed on substrate 202. For example, each antenna portion may be divided into multiple antenna segments at multiple segment points. The first and second antenna lengths may be modified by electrically isolating at least a first antenna segment from a second antenna segment. The antenna length may be modified by severing each antenna portion at one of multiple segment points, with each segment point to correspond to an operating frequency for antenna 204. Dividing first antenna portion 306 and second antenna portion 308 into multiple antenna segments results in shortening the length of each antenna portion, and thereby effectively changes the total inductance of antenna 204. The antenna segments and segment points are described in more detail with reference to FIG. 6.

Figure 6:
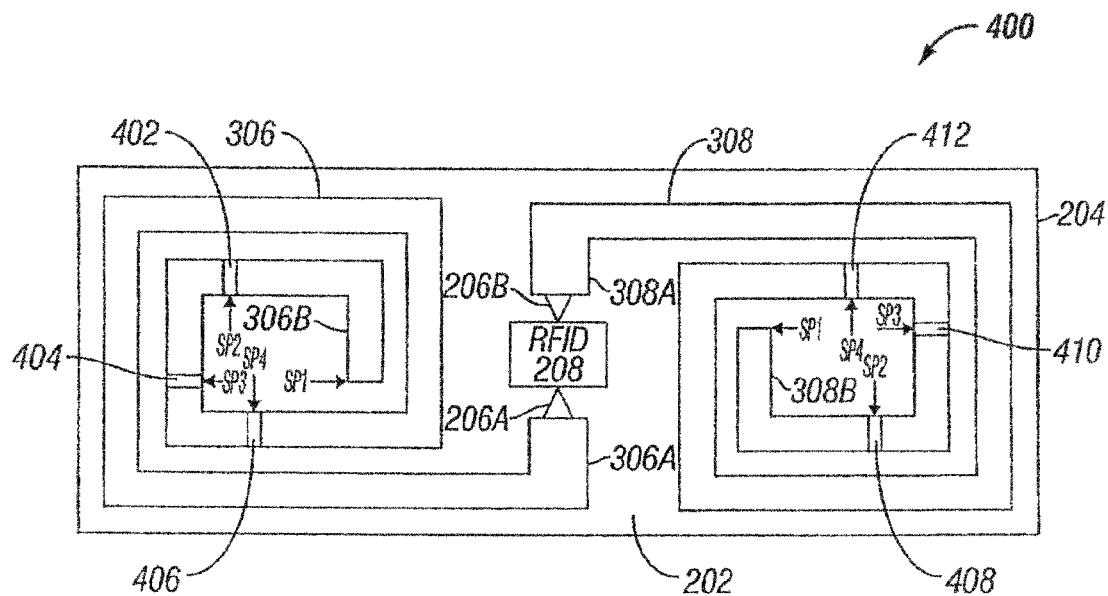
FIG. 6 illustrates a top view of a security tag with an antenna having segment points in accordance with an alternate embodiment of the present disclosure.

FIG. 6 illustrates a diagram of a security tag 400 with an antenna having segment points in accordance with one embodiment. In particular, FIG. 6 illustrates a top view of portions of security tag 400 with multiple segment points SP1, SP2, SP3 and SP4. In a similar manner as shown in FIG. 4 with respect to security tag 200, security tag 400 may include EAS component 1, spacer 210 and RFID component 2. Antenna 204 may be tuned also to a desired operating frequency by modifying a first length for first antenna portion 306, and a second length for second antenna portion 308, after these antenna portions are disposed on substrate 202. For example, it is contemplated that each antenna portion may be divided into multiple antenna segments at multiple segment points SP1-SP4. Multiple segment points SP1 through SP4 represent end tuning positions where the antenna 204 may be cut or trimmed in order to be tuned to various objects. SP1 is the free space position where the length of original free space antenna 204 is tuned to 868 MHz. SP2 is the free space position where the length of antenna portions 306 and 308 is tuned to 915 MHz. SP3 and SP4 are the free space positions where the length of antenna portions 306 and 308 is tuned to the various objects. The various objects include, for example and are not limited to, retail and/or wholesale merchandise.

The first and second antenna lengths may be modified by electrically isolating at least a first antenna segment from a second antenna segment. The antenna length may be modified by severing each antenna portion at one of multiple segment points, with each segment to correspond to an operating frequency for antenna 204. The severing may be achieved in a number of different ways, such as cutting or punching the antenna trace at a given segment point SP1-SP4. The severing may create a slot at the segment point, such as slots 402, 404, 406, 408, 410, and 412.

It should be noted that for HF applications, antenna 204 is tuned by changing the inductance or capacitance parameters but not the lengths of the segments.

In one embodiment, and as shown in FIG. 6, each segment point SP1-SP4 corresponds to an operating frequency for antenna 204. In one example, SP1 may tune antenna 204 for an operating frequency of approximately 868 MHz when security tag 400 is in free space and unattached to an object. SP2 may tune antenna 204 for an operating frequency of approximately 915 MHz when security tag 400 is in free space and unattached to an object. SP3 may tune antenna 204 for an operating frequency of approximately 915 MHz when security tag 400 is attached to a VHS cassette housing. SP4 may tune antenna 204 for an operating frequency of approximately 915 MHz when security tag 400 is attached to a chip board. As can be appreciated, the number of segment points and corresponding operating frequencies for antenna 204 may vary according to a given implementation. The embodiments are not limited in this context.

Figure 7:
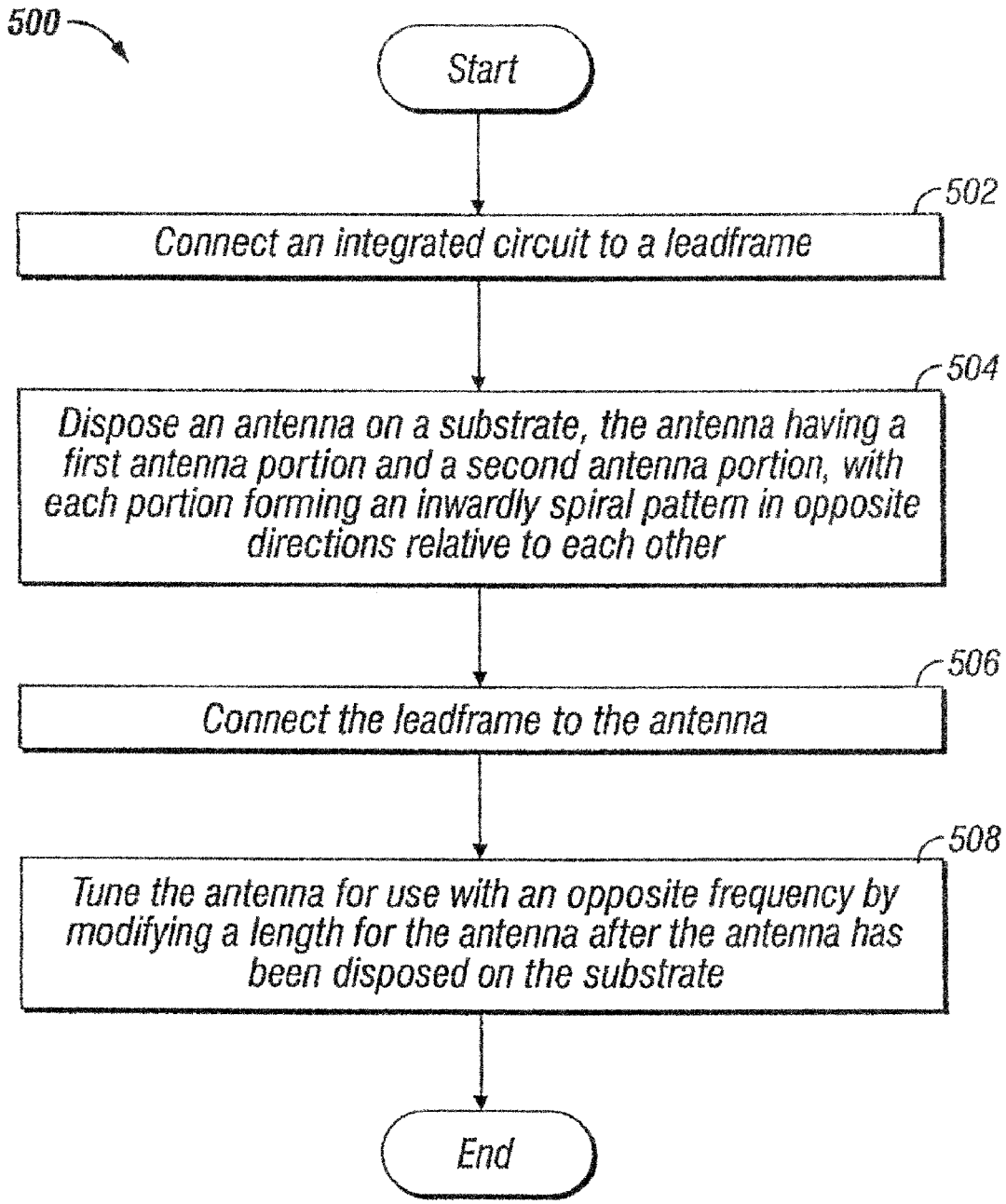
FIG. 7 illustrates a block flow diagram in accordance with one embodiment of the present disclosure.

FIG. 7 illustrates a block flow diagram 500 in accordance with another embodiment of the present invention. As mentioned above, security tag 200 may be configured in a number of different ways. For example: 1) an integrated circuit may be connected to a lead frame at block 502; 2) an antenna may be disposed on a substrate at block 504; 3) the lead frame may be connected to the antenna at block 506.

In one particular embodiment, the antenna is tuned for use with an operating frequency at block 508. The tuning may be performed by modifying a length for the antenna by severing the antenna into multiple antenna segments at a segment point corresponding to the operating frequency. The severing may electrically disconnect a first antenna segment from a second antenna segment, thereby effectively shortening the length of the antenna.

As described above, the unique antenna geometry of an inwardly spiral pattern may be useful for RFID applications when connected to an RFID chip. As previously noted, the unique antenna geometry shown in FIGS. 5 and 6, however, may also be useful for an EAS system where security tag 200 and security tag 400, respectively, each include EAS component 1 and spacer 210. In one embodiment, RFID chip 208 may be replaced with a diode or other non-linear passive device where the voltage and current characteristics are non-linear. The antenna for the diode or other passive non-linear EAS device may have the same geometry as shown in FIGS. 5 and 6, and may be trimmed to tune the antenna to the operating frequency of the transmitter used to transmit interrogation signals for the EAS system. Similar to RFID system 100, the range of operating frequencies may vary, although the embodiments may be particularly useful for the UHF spectrum, such as 868-950 MHz. The embodiments are not limited in this context.

As previously discussed with respect to FIGS. 3A, 3B, 4 and 4A, the read range R1 of the combination EAS and RFID tag or label 200 may be measured, controlled and varied by varying the thickness "t" of the spacer 210. In a similar manner, the read range R1 of the security tag 400 may also be measured, controlled and varied by varying the thickness "t" of the spacer 210.

It is also contemplated that some embodiments of the present disclosure may be configured using an architecture that may vary in accordance with any number of factors, such as: 1) desired computational rate; 2) power levels; 3) heat tolerances; 4) processing cycle budget; 5) input data rates; 6) output data rates; 7) memory resources; 8) data bus speeds and other performance constraints. For example, an embodiment may be configured using software executed by a general-purpose or special-purpose processor. In another example, an embodiment may be configured as dedicated hardware, such as a circuit, an ASIC, Programmable Logic Device (PLD) or a digital signal processor (DSP). In yet another example, an embodiment may be configured by any combination of programmed general-purpose computer components and custom hardware components. The embodiments are not limited in this context.

Figure 8A:
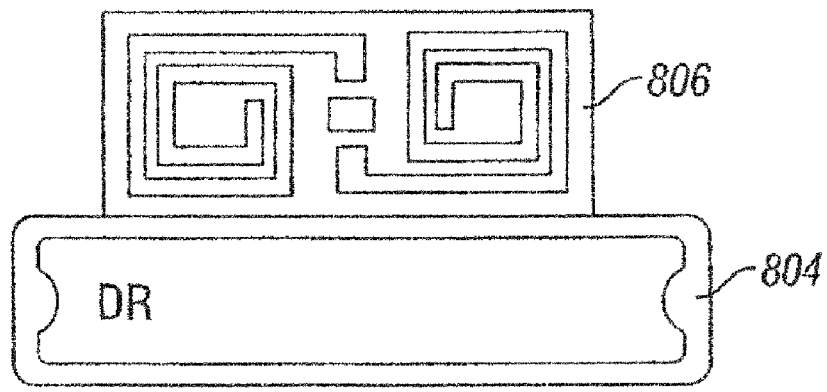
FIG. 8A illustrates a prior art configuration of a co-planar EAS label adjacent to an RFID label.
Figure 8B:
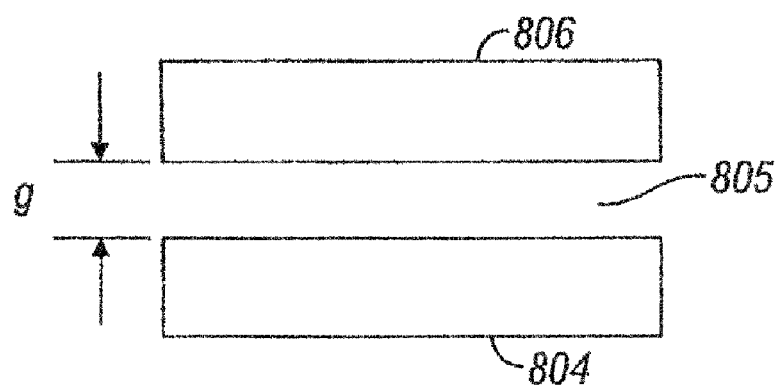
FIG. 8B illustrates a prior art configuration of a co-planar EAS label and an RFID label which are separated by a gap.

Examples of security tags 200 and 400, which are combination EAS and RFID labels/tags, are shown in FIGS. 8A to 8D which show various types of adhesive magnetostrictive labels and EAS hard tags, such as the SuperTag® produced by Sensormatic, a division of Tyco Fire and Security, LLC of Boca Raton, Fla. FIG. 8A illustrates an EAS label 804 adjacent to an RFID label 806 in a co-planar configuration. This configuration of adjacent labels 804 and 806 is known in the prior art. FIG. 8B illustrates a variation of the co-planar configuration of EAS label 804 and RFID label 806 of FIG. 8A wherein the EAS label 804 and the RFID label 806 are separated from each other by a gap 805 having a distance "g". This configuration of 804 and 806 being separated by gap 805 is also known in the prior art.

In both the configuration of FIGS. 8A and 8B, the EAS label 804 and the RFID label 806 act independently of one another with respect to matching of impedance values. As "g" increases, the read range increases. As a result, the size of gap "g" controls the impedance load. However, this is not a desirable effect because although the read range increases, the total area occupied by the EAS label 804 and RFID label 806 increases, necessarily occupying more space or area on an object to be identified.

Figure 8C:
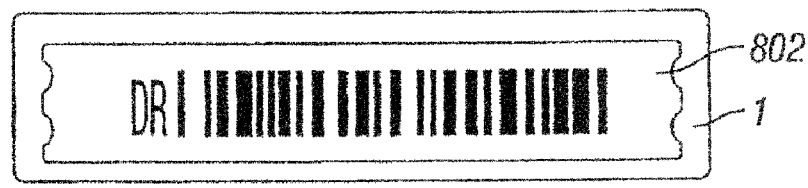
FIG. 8C illustrates an embodiment of the present disclosure of a combination EAS component with an RFID component mounted directly underneath the EAS component.

FIG. 8C illustrates an embodiment of the present disclosure of a security tag 200 or 400 showing an EAS component or label 1. An RFID component or insert 2 is mounted directly underneath the EAS component or label 1. A dummy bar code 802 is printed on the EAS component or label 1 and is just for visual purposes only. Dummy bar code 802 has no EAS or RFID function. As compared to the prior art, the configuration of security tag 200 or 400 as a combination EAS component or label or tag 1 with RFID component or insert 2 mounted directly underneath the EAS component or label 1 (as shown in FIG. 4) provides a minimal separation between the RFID component or insert 2 and the EAS label 1.

Figure 8D:
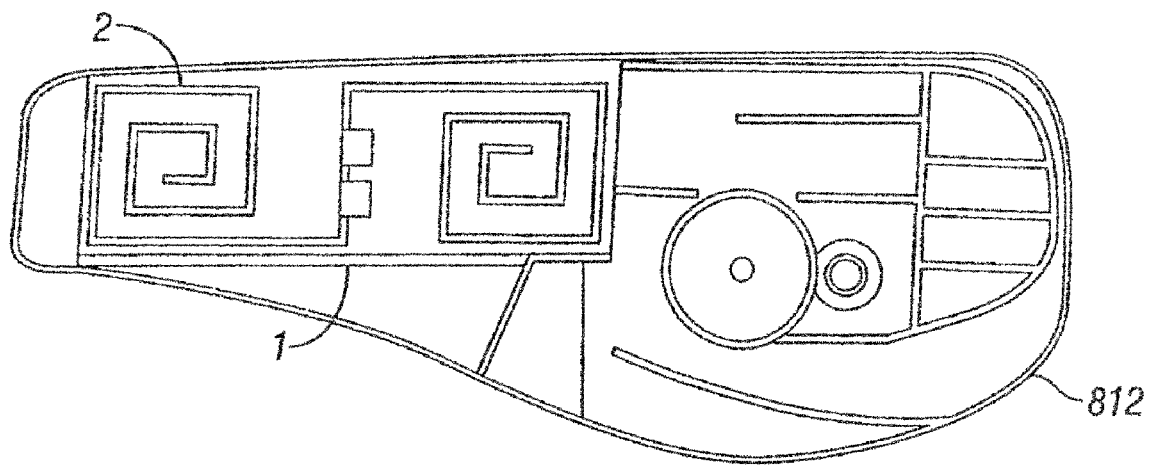
FIG. 8D illustrates an embodiment of the present disclosure of one portion of a security tag combination EAS component with an RFID component insert.

FIG. 8D illustrates one embodiment of the present disclosure of one portion 812 of a housing for combination EAS component or label 1 with RFID component or insert 2. The RFID component or insert 2 is defined as including RFID chip 208 mounted on antenna 204. However, spacer 210 or an adhesive layer are not visible (See FIG. 4).

Figure 8E:
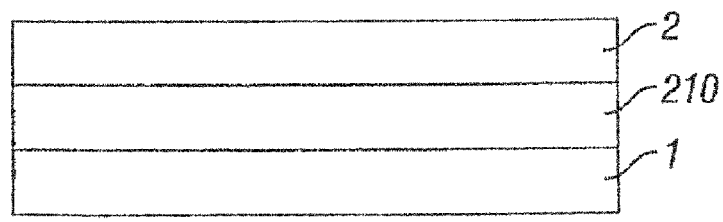
FIG. 8E is an elevation view of the embodiment of the present disclosure of FIG. 8D.

FIG. 8E is an elevation view of the combination EAS component or label 1 with RFID component or insert 2 disclosed in FIG. 8D, but showing spacer 210 disposed between the EAS component or label 1 and the RFID component or insert 2.

Figure 8F:
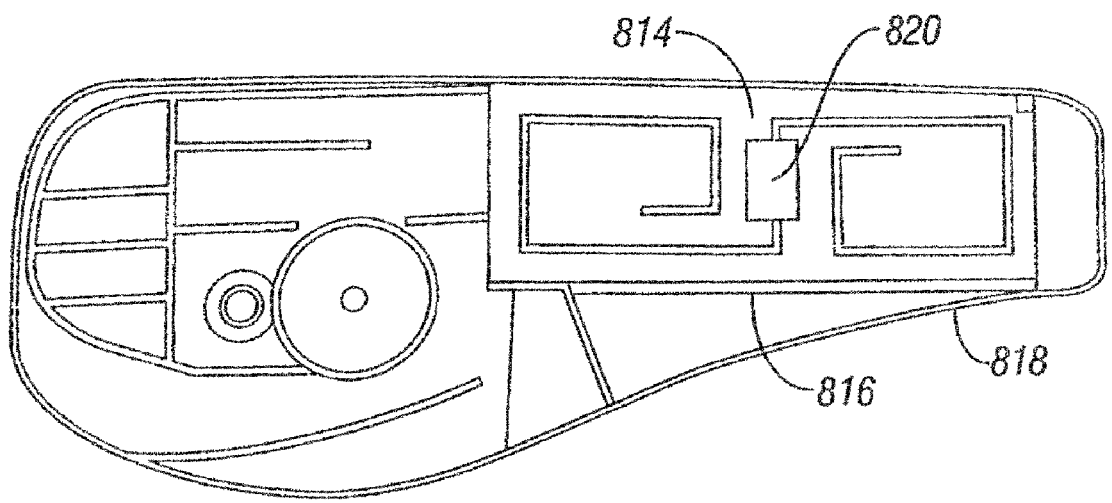
FIG. 8F illustrates an embodiment of the present disclosure of one portion of a security tag combination EAS component with an RFID component insert.

FIG. 8F illustrates one embodiment of the present disclosure of one portion 818 of a housing for a combination EAS label 816 similar to EAS component or label 1 with an RFID insert 814 which is similar to RFID component or insert 2. The RFID insert 814 is defined as another RFID chip 820 mounted on antenna 204. Again, spacer 210 or an adhesive layer are not visible (See FIG. 4).

Figure 8G:
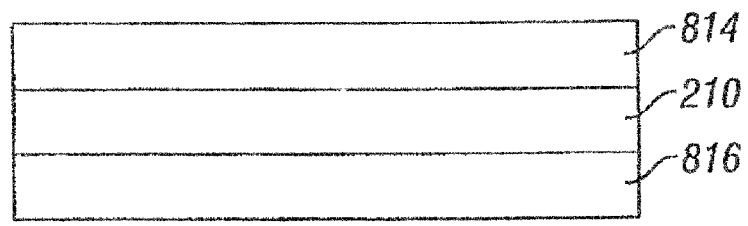
FIG. 8G is an elevation view of the embodiment of the present disclosure of FIG. 8F.

FIG. 8G is an elevation view of the combination EAS label 816 with RFID insert 814 disclosed in FIG. 8F, but showing spacer 210 disposed between the EAS label 816 and the RFID insert 814.

Figure 9:
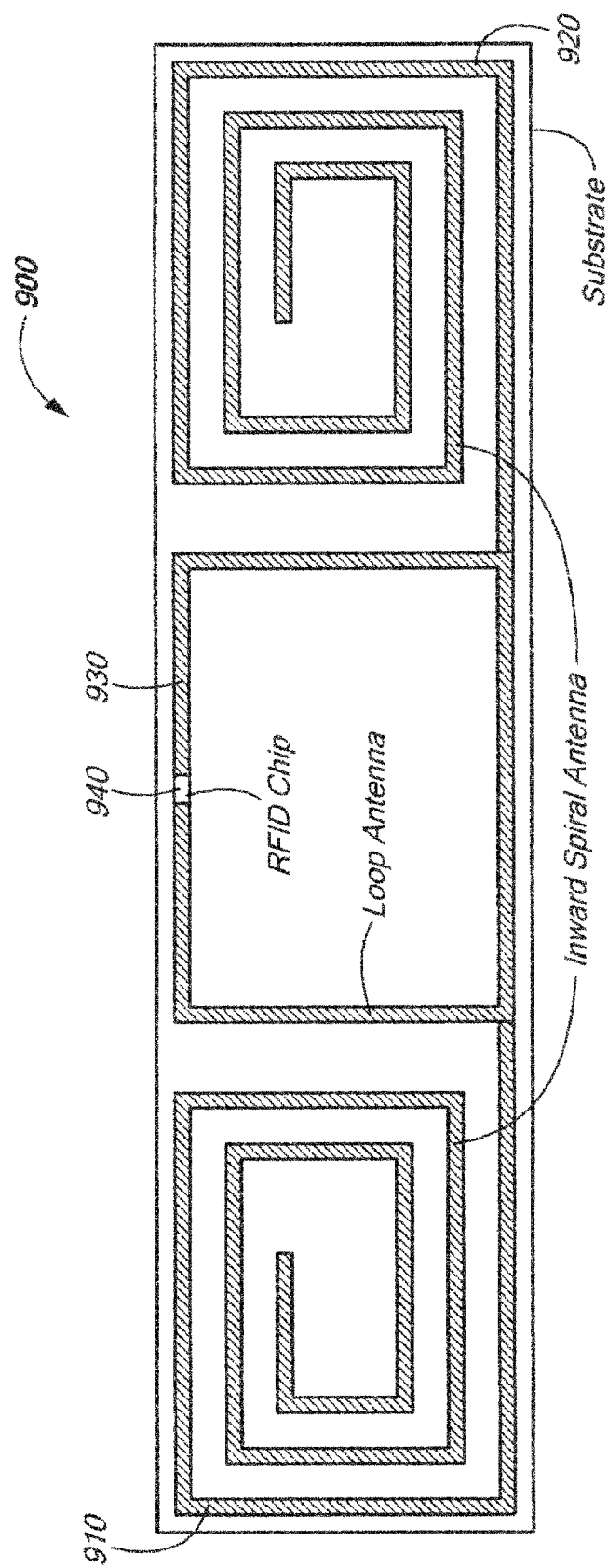
FIG. 9 illustrates an embodiment of the present disclosure of a combination EAS/RFID tag with a hybrid antenna inlay using a loop antenna between two inward spiral antennas.

FIG. 9 illustrates another embodiment of the invention. In FIG. 9, a combination EAS/RFID security tag includes a hybrid antenna inlay 900 having a spiral antenna with two inward spiral antenna sections 910 and 920, as well as a rectangular magnetic loop antenna 930 electrically coupled to the inward spiral antennas 910 and 920. RFID chip 940 is electrically coupled to magnetic loop antenna 930 and magnetic loop antenna 930 is electrically connected to the inward spiral antennas 910 and 920 as shown in FIG. 9. In a particular non-limiting example, the Impinj Gen. 2 Monza RFID chip is used. The overall geometry of magnetic loop antenna 930 is such that the near field magnetic H performance is optimized. Spiral antennas 910 and 920 advantageously dominate the far field response.

Magnetic loop antenna 930 also serves as a way to reduce ESD damage to RFID chip 940. For low frequency or static electric E fields produced by manufacturing processes or ultrasonic welding of the hard tag housing, the magnetic loop antenna 930 is essentially a short circuit across RFID chip 940. For example, if an electrical discharge initiates from one end of spiral antenna 910 to the end of spiral antenna 920, loop antenna 930 diverts the discharge current away from RFID chip 940.

Physically, the spiral antennas 910 and 920 are connected to magnetic loop antenna 930 and not directly to RFID chip 940. When an E field is applied along the length of the hybrid spiral/loop antenna inlay shown in FIG. 9, the current starts at the end of spiral antenna 910 (shown on the left in FIG. 9) at low levels and gradually increases to the connection point of the magnetic loop antenna 930. This current sense is therefore counterclockwise. The magnetic loop current is also of a counterclockwise sense but at much larger values. The current from the magnetic loop connection point to the spiral antenna 920 (shown on the right in FIG. 9) is of a counterclockwise sense and gradually decreases toward the end of this antenna trace. Thus, the direction of the currents in each spiral antenna 910 and 920 is the same.

The hybrid antenna inlay 900 shown in FIG. 9 is then placed inside of the housing of the hybrid EAS/RFID tag which contains the EAS component 1, a spacing element 210, and an attachment clamp mechanism. The EAS/RFID security tag utilizing the hybrid antenna inlay 900 of FIG. 9 can be read by any conventional RFID reader.

Figure 9A:
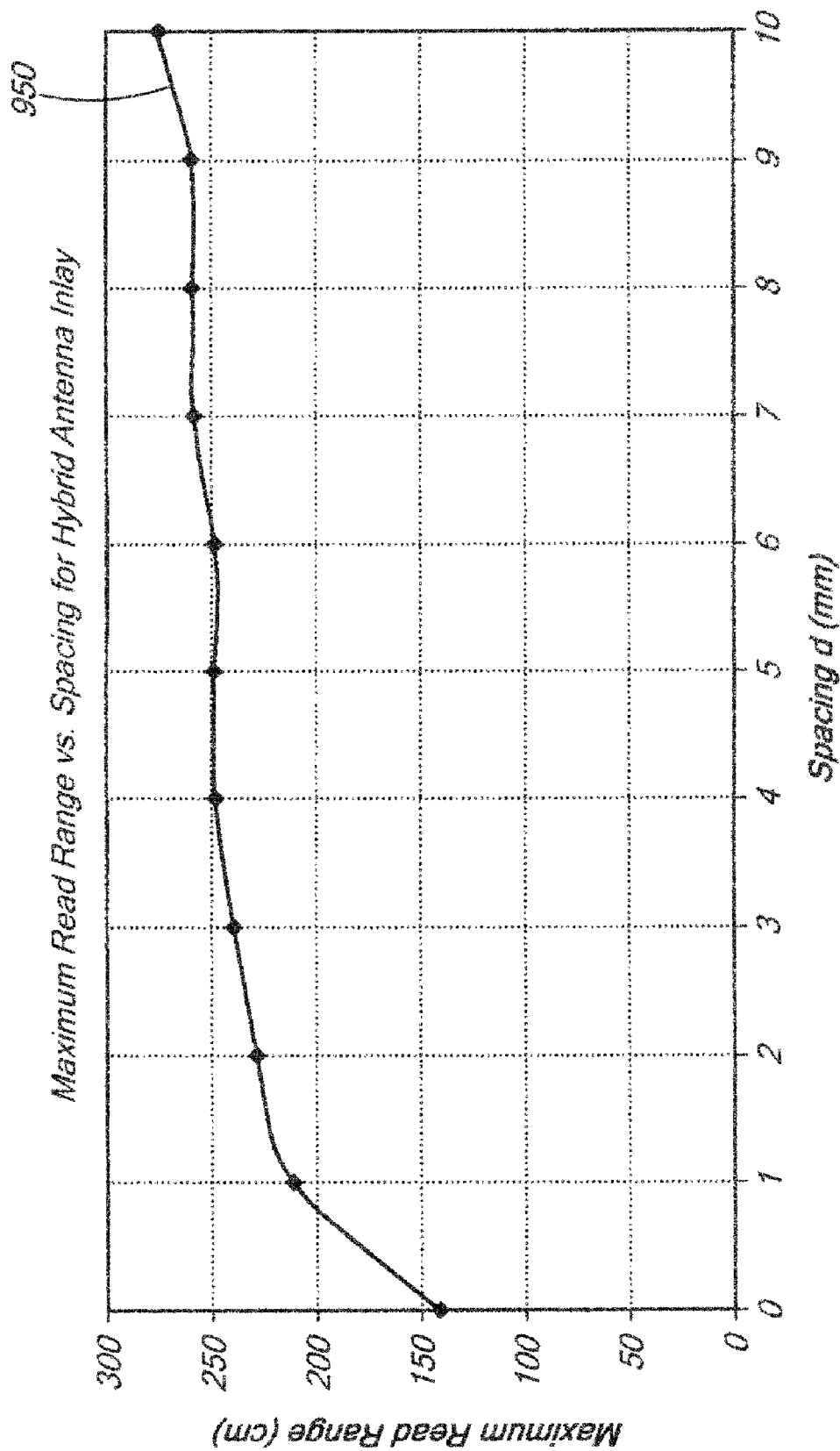
FIG. 9A illustrates sample test data for the read range of the security tag with hybrid antenna inlay of FIG. 9 as a function of the thickness of a spacer between EAS and RFID components of the security tag.

FIG. 9A illustrates the dependence of the maximum read range as a function of the spacing element 210. FIG. 9A shows actual data 950 representing the maximum read range as a function of the thickness of spacer 210 for a security tag such as security tag 200 consisting of an EAS element such as EAS component 1 and an RFID element such as RFID component 2 in a hard tag housing the hybrid antenna inlay 900 of FIG. 9.

The y-axis displays the read range in centimeters (cm), while the x-axis displays the thickness "d" of spacer 210 in millimeters (mm). The actual data 950 shows that as the thickness "d" of the spacer is increased to 4 mm or more, the read range becomes essentially constant at about 250 centimeters. As the spacer thickness "d" is decreased to a value of about 1 mm, the read range decreases to about 210 centimeter. The read range continues to decrease with reduced spacer thickness "d" as the losses in the EAS component 1 become larger with decreased spacer thickness "d".

An example of a near field reader magnetic H field loop antenna used with the present invention is a 2 cm. diameter circular loop using a step-down transformer at the feed end of the loop, two tuning capacitors at the halfway point, and a terminating resistor at the opposite end of the loop. However, the invention is not limited to a particular diameter or type of near field reader loop antenna. The near field reader loop antenna may also include a cylindrical slug of ferrite material. The near field reader loop antenna is typically smaller in size than a conventional near field E field antenna.

Figure 9B:
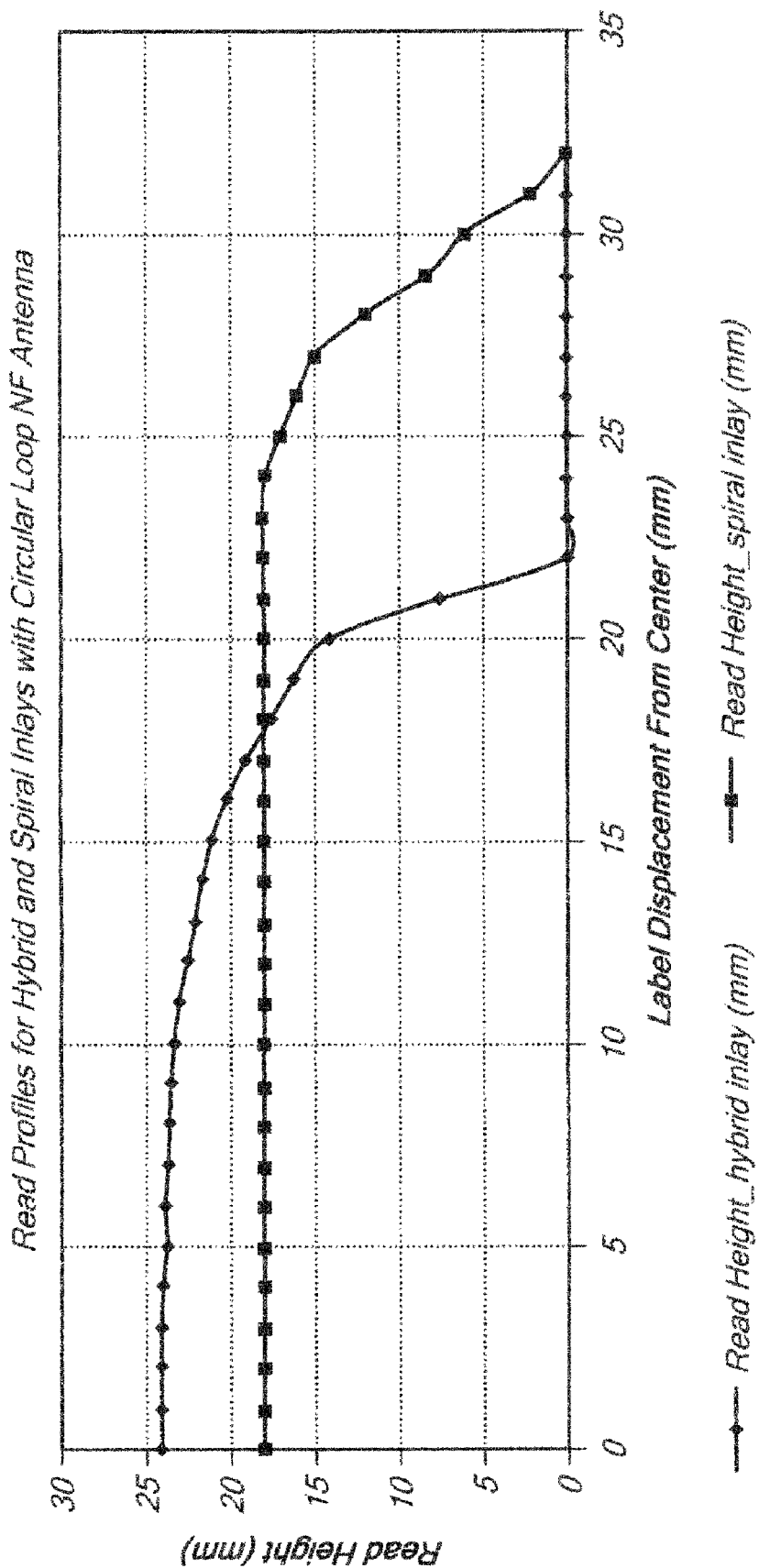
FIG. 9B illustrates sample test date for the read height of the security tag with the hybrid antenna inlay of FIG. 9 as a function of the antenna inlay displacement from the center of the antenna.

FIG. 9B shows the RFID read performance characteristics for the hybrid antenna inlay 900 of FIG. 9 and that of the prior art spiral antenna inlay as a function of tag displacement from the inlay center relative to that of the center of the near field reader magnetic loop antenna. As can be observed in FIG. 9B, using the hybrid antenna inlay 900 provides a superior read distance above the antenna as compared with the conventional antenna arrangements and also provides an abrupt read region (the extent of inlay displacement from the center of the antenna).

Figure 9C:
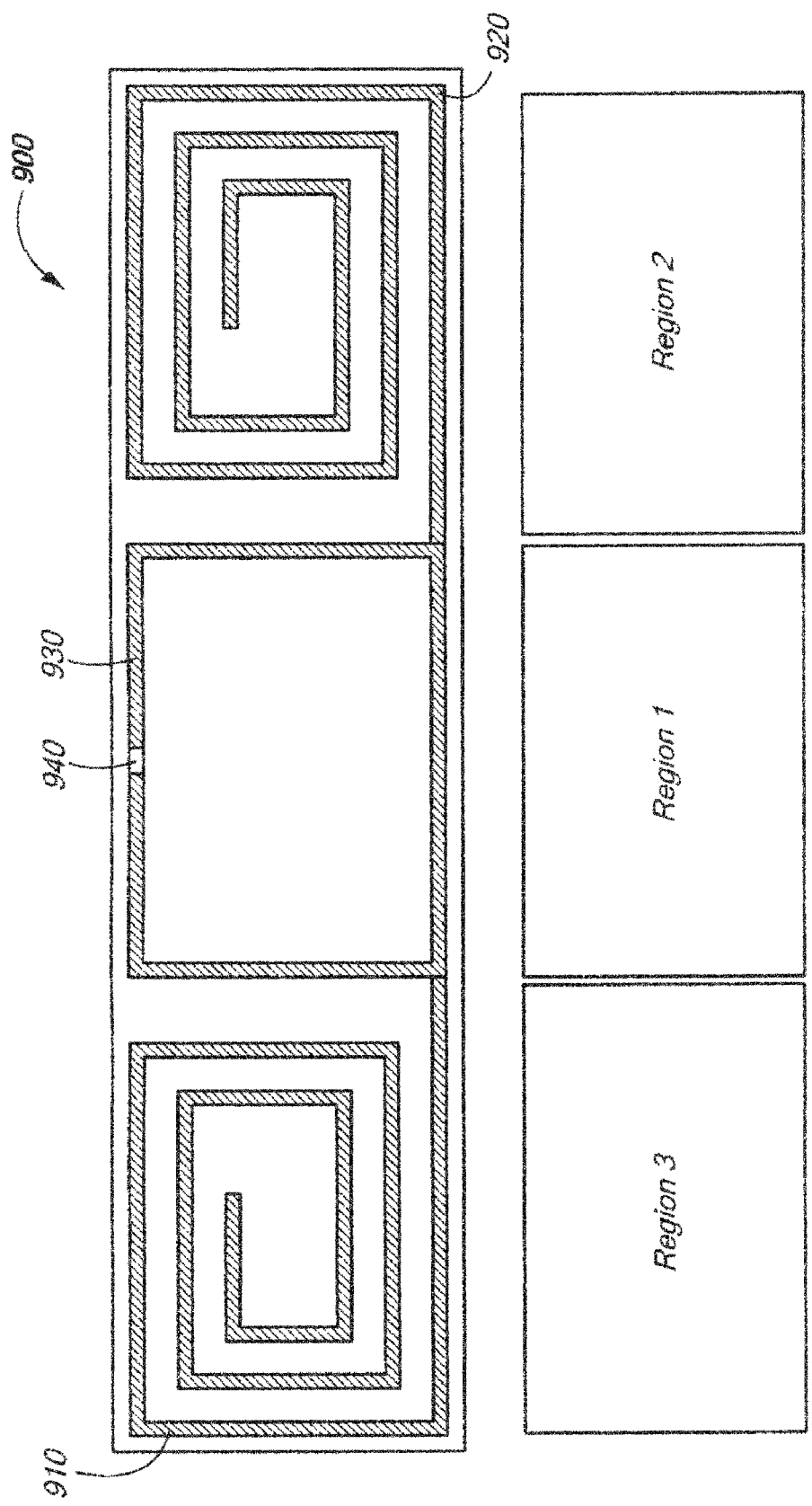
FIG. 9C illustrates the hybrid antenna inlay embodiment of FIG. 9 with the respective response regions of the loop and spiral antennas.

Using the hybrid antenna inlay 900 with the combination EAS/RFID tag not only provides the same far field read performance as a pure spiral antenna, but also provides an improved near field magnetic response. For a given overall size of hybrid antenna inlay 900, the ratio of the spiral antenna regions to that of the magnetic loop antenna region should be maintained. FIG. 9C illustrates these antenna regions.

In FIG. 9C, region 1 represents the region for magnetic loop antenna 930, while regions 2 and 3 represent the right hand side and left hand side of the inward spiral antennas 920 and 910, respectively. In one embodiment, in order to achieve the same far field response as a spiral antenna, the hybrid antenna inlay 900 has a substantially similar area ratio for all three regions. For example, if the area of region 1 is substantially smaller than regions 2 and 3, the far field response may be the same as that of the spiral but may not optimize the near field magnetic response. If region 1 becomes substantially larger than regions 2 and 3, for a given overall size of inlay 900, there may not enough space for the spiral antenna traces to operate in the UHF region when placed inside of a combination EAS/RFID security tag. The types of EAS devices and RFID combinations are not limited solely to the EAS and RFID devices described herein.

It is contemplated that the spacer element (or a plurality of spacer elements) may be configured in different geometric configurations or patterns with different or varying dimensions (i.e., length, width, thickness, etc.) to effect the read range depending upon a particular purpose or to further regulate the read range of RFID components. The RFID element read range is affected and controlled by the spacing between the RFID element and the EAS element.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A security tag comprising:
    an electronic article surveillance (EAS) component having a first defined surface area;
    a radio frequency (RFID) component having a second defined surface area, the RFID component comprising:
        an antenna inlay configured to impedance match using properties of the EAS component, the antenna inlay comprising:
            a far field antenna;
            a near field magnetic loop antenna in electrical contact with the far field antenna; and
            an integrated circuit in electrical contact with the near field magnetic loop antenna; and
    a substantially planar spacer having a thickness, the spacer at least partially disposed between the first defined surface area of the EAS component and the second defined surface area of the RFID component, the thickness of the spacer being configurable to regulate a read range of the RFID component.

2. The security tag of claim 1, the far field antenna having a first section and a second section, and wherein the near field magnetic loop antenna is positioned between the first section and the second section.

3. The security tag of claim 2, wherein the far field antenna is an inward spiral antenna, and wherein the first section of the spiral antenna, the second section of the spiral antenna, and the near field magnetic loop antenna each have a corresponding defined area, the defined of the near field magnetic loop antenna being not greater than the defined areas of the first section and the second section.

4. The security tag of claim 1, wherein the RFID component is capable of activation when the RFID component is within the read range.

5. The security tag of claim 2, wherein currents in the first and the second sections of the far field antenna flow in a same sense, the sense being one of clockwise and counterclockwise.

6. The security tag of claim 1, wherein the far field antenna is an inward spiral antenna.

7. A method of regulating a read range of a combination electronic article surveillance (EAS) component and radiofrequency identification (RFID) component, the method comprising:

disposing a spacer between the EAS component and the RFID component, the RFID component comprising an antenna inlay having a far field antenna in electrical contact with a near field magnetic loop antenna, and an integrated circuit in electrical contact with the near field magnetic loop antenna;

varying the thickness of the spacer to regulate a read range of the RFID component; and using the EAS component to adjust an impedance of the antenna inlay associated with the RFID component.

8. The method of claim 7, wherein the RFID component is capable of activation when the RFID component is within the read range.

9. The method of claim 7, wherein the far field antenna has a first section and a second section, and wherein the near field magnetic loop antenna is positioned between the first section and the second section of the far field antenna.

10. The method of claim 9, wherein the far field antenna is an inward spiral antenna, and wherein the first section and the second section of the spiral antenna each have a corresponding defined area, and wherein the near field magnetic loop antenna has a corresponding defined area, wherein the defined area of the near field magnetic loop antenna is not greater than the defined areas of first section and the second section.

11. The method of claim 9, wherein currents in the first and the second sections of the far field antenna flow in a same sense, the sense being one of clockwise and counterclockwise.

12. The method of claim 7 wherein the far field antenna is an inward spiral antenna.

13. An RFID antenna inlay for use in a combination EAS/RFID security tag, the EAS/RFID security tag having an EAS component, an RFID component, and a spacer element positioned between the EAS component and the RFID component, the antenna inlay comprising:

a far field antenna having a first section and a second section;

a near field magnetic loop antenna coupled to the far field antenna and situated between the first section of the far field antenna and the second section of the far field antenna, the antenna inlay being configured to impedance match using properties of the EAS security tag; and an integrated circuit coupled to the near field magnetic loop antenna, the spacer element having a thickness, the thickness of the spacer element being configurable to regulate a read range of the RFID component.

14. The RFID antenna inlay of claim 13, wherein the first section of the far field antenna, the second section of the far field antenna, and the near field magnetic loop antenna each have a defined area, the defined of the near field magnetic loop antenna being not greater than the defined areas of the first section and the second section.

15. The RFID antenna inlay of claim 13, wherein the RFID component is capable of activation when the RFID component is within the read range.

16. The RFID antenna inlay of claim 13, wherein currents in the first and the second sections of the far field antenna flow in a same sense, the sense being one of clockwise and counterclockwise.

17. The RFID antenna inlay of claim 13, wherein far field antenna is an inward spiral antenna.

* * * * *